United States Patent
Meng et al.

(10) Patent No.: US 10,567,422 B2
(45) Date of Patent: Feb. 18, 2020

(54) METHOD, APPARATUS AND SYSTEM FOR PROCESSING ATTACK BEHAVIOR OF CLOUD APPLICATION IN CLOUD COMPUTING SYSTEM

(71) Applicant: Huawei Technologies Co., Ltd., Shenzhen (CN)

(72) Inventors: Zechao Meng, Shenzhen (CN); Hewei Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 15/606,855

(22) Filed: May 26, 2017

(65) Prior Publication Data

US 2017/0264637 A1 Sep. 14, 2017

Related U.S. Application Data

(63) Continuation of application No. PCT/CN2015/079897, filed on May 27, 2015.

(30) Foreign Application Priority Data

Nov. 26, 2014 (CN) .......................... 2014 1 0709018

(51) Int. Cl.
*H04L 29/06* (2006.01)
*G06F 9/455* (2018.01)
(Continued)

(52) U.S. Cl.
CPC ...... *H04L 63/1441* (2013.01); *G06F 9/45558* (2013.01); *H04L 63/1416* (2013.01);
(Continued)

(58) Field of Classification Search
CPC ............. H04L 63/1441; H04L 63/1416; H04L 69/329; G06F 9/45558
See application file for complete search history.

(56) References Cited

U.S. PATENT DOCUMENTS 8,539,556 B1 9/2013 Brandwine
8,613,089 B1 12/2013 Holloway et al.
(Continued)

FOREIGN PATENT DOCUMENTS

CN 101438255 A 5/2009
CN 102043917 A 5/2011
(Continued)

OTHER PUBLICATIONS

Kholidy et al. (CIDS: A framework for Intrusion Detection in Cloud Systems, 2012 IEEE, pp. 379-385) (Year: 2012).*
(Continued)

*Primary Examiner* — Oleg Korsak
(74) *Attorney, Agent, or Firm* — Conley Rose, P.C.

(57) ABSTRACT

An apparatus for processing an attack behavior of a cloud application in a cloud computing system, including a policy manager configured to store a security determining rule and a malicious application processing rule, a security analyzer configured to receive application behavior data from a security detector, and send the application behavior data to a security processor when the cloud application running on the cloud host has an attack behavior, and the security processor is configured to invoke, according to the malicious application processing rule, an interface provided by a cloud controller in order to process the cloud application having an attack behavior. The apparatus performs security protection based on an application level of cloud computing, which can prevent mutual attack between different applications on a same host, and reduce impact on a normal application.

20 Claims, 10 Drawing Sheets

(51) Int. Cl.
*H04L 29/08* (2006.01)
*H04W 12/12* (2009.01)

(52) U.S. Cl.
CPC .. *H04L 69/329* (2013.01); *G06F 2009/45587* (2013.01); *H04L 63/1408* (2013.01); *H04L 63/1425* (2013.01); *H04L 63/1466* (2013.01); *H04W 12/12* (2013.01)

(56) References Cited

U.S. PATENT DOCUMENTS

| | | | |
|---|---|---|---|
| 2006/0005228 A1* | 1/2006 | Matsuda | H04L 63/0263 726/1 |
| 2006/0123479 A1 | 6/2006 | Kumar et al. | |
| 2011/0083179 A1 | 4/2011 | Lawson et al. | |
| 2013/0133068 A1 | 5/2013 | Jiang | |
| 2014/0189865 A1 | 7/2014 | Abuelsaad et al. | |
| 2014/0196105 A1 | 7/2014 | Hung | |
| 2014/0208426 A1 | 7/2014 | Natarajan et al. | |

FOREIGN PATENT DOCUMENTS

| | | |
|---|---|---|
| CN | 102075535 A | 5/2011 |
| CN | 102291390 A | 12/2011 |
| CN | 102685180 A | 9/2012 |
| CN | 102693388 A | 9/2012 |
| CN | 102843385 A | 12/2012 |
| CN | 103023912 A | 4/2013 |
| CN | 103034807 A | 4/2013 |
| CN | 103036745 A | 4/2013 |
| CN | 103051707 A | 4/2013 |
| CN | 103746991 A | 4/2014 |
| CN | 103902892 A | 7/2014 |
| CN | 104038466 A | 9/2014 |
| CN | 104113521 A | 10/2014 |
| CN | 104392175 A | 3/2015 |
| WO | 2012075866 A1 | 6/2012 |

OTHER PUBLICATIONS

Tupakula, U., et al., "Intrusion Detection Techniques for Infrastructure as a Service Cloud," XP032085389, IEEE Ninth International Conference on Dependable, Autonomic and Secure Computing, Dec. 12, 2011, pp. 744-751.
Foreign Communication From a Counterpart Application, European Application No. 15862949.3, Extended European Search Report dated Sep. 21, 2017, 11 pages.
Tupakula, U., et al., "Intrusion Detection Techniques for Infrastructure as a Service Cloud," XP32086389, IEEE Ninth International Conference on Dependable, Autonomic and Secure Computing, Dec. 12, 2011, pp. 744-751.
Machine Translation and Abstract of Chinese Publication No. CN102075535, dated May 25, 2011, 8 pages.
Machine Translation and Abstract of Chinese Publication No. CN102291390, dated Dec. 21, 2011, 6 pages.
Machine Translation and Abstract of Chinese Publication No. CN102843385, dated Dec. 26, 2012, 9 pages.
Machine Translation and Abstract of Chinese Publication No. CN103023912, dated Apr. 3, 2013, 6 pages.
Machine Translation and Abstract of Chinese Publication No. CN103034807, dated Apr. 10, 2013, 14 pages.
Machine Translation and Abstract of Chinese Publication No. CN103036745, dated Apr. 10, 2013, 8 pages.
Machine Translation and Abstract of Chinese Publication No. CN103051707, dated Apr. 17, 2013, 9 pages.
Machine Translation and Abstract of Chinese Publication No. CN103746991, dated Apr. 23, 2014, 8 pages.
Machine Translation and Abstract of Chinese Publication No. CN104038466, dated Sep. 10, 2014, 32 pages.
Machine Translation and Abstract of Chinese Publication No. CN104113521, dated Oct. 22, 2014, 5 pages.
Machine Translation and Abstract of Chinese Publication No. CN104392175, dated Mar. 4, 2015, 15 pages.
Foreign Communication From a Counterpart Application, Chinese Application No. 201410709018.9, Chinese Search Report dated Nov. 21, 2016, 2 pages.
Foreign Communication From a Counterpart Application, Chinese Application No. 201410709018.9, Chinese Office Action dated Dec. 1, 2016, 8 pages.
Foreign Communication From a Counterpart Application, PCT Application No. PCT/CN2015/079897, English Translation of International Search Report dated Jul. 30, 2015, 2 pages.
Foreign Communication From a Counterpart Application, PCT Application No. PCT/CN2015/079897, English Translation of Written Opinion dated Jul. 30, 2015, 8 pages.

* cited by examiner

METHOD, APPARATUS AND SYSTEM FOR PROCESSING ATTACK BEHAVIOR OF CLOUD APPLICATION IN CLOUD COMPUTING SYSTEM

CROSS-REFERENCE TO RELATED APPLICATIONS

This application is a continuation of International Patent Application No. PCT/CN2015/079897 filed on May 27, 2015, which claims priority to Chinese Patent Application No. 201410709018.9 filed on Nov. 26, 2014. The disclosures of the aforementioned applications are hereby incorporated by reference in their entireties.

TECHNICAL FIELD

The present disclosure relates to the field of computer technologies, and in particular, to a method and an apparatus for processing an attack behavior of a cloud application in a cloud computing system, and a system.

BACKGROUND

As defined by the National Institute of Standards and Technology (NIST), cloud computing has three service modes, namely, software as a service (SaaS), platform as a service (PaaS), and infrastructure as a service (IaaS). The PaaS is a commercial mode of providing a server platform as a service. The PaaS mainly provides hardware resources such as a central processing unit (CPU) and a memory and software resources such as an operating system and a library on which a program depends for a cloud application, and a developer of the cloud application does not need to consider software and hardware environments in which the application runs, and focuses on development of the application program. Emergence of the PaaS accelerates development and deployment of cloud applications. Therefore, in this Internet era, more cloud applications may be deployed in a cloud computing system.

In the cloud computing system (which may be briefly referred to as a cloud system), to increase utilization of hardware resources of the system, generally, multiple cloud applications may run on a same cloud host (which is a hardware host or a virtual host, and has different implementations for different cloud computing systems), and the cloud computing system provides necessary system resource isolation for the cloud applications in order to ensure that cloud applications running on the same cloud host do not interfere with each other. In addition, the cloud computing system further provides a virtual network in the cloud host such that the cloud applications communicate with each other.

In another aspect, in the network security field, before attacking a target machine, hackers generally look for zombies (puppet machines that can be controlled) on a network first, and launch attacks using the zombies in order to hide their identities. In this way, even if the attacked parties detect the attacks, they can find only addresses of the zombies, but cannot find real addresses of the hackers. After emergence of the cloud computing system, the network hackers no longer need to look for zombies, but directly run their attack programs in the cloud computing system, and can run multiple instances of the attack programs in order to form a large-scale attack system. In the cloud computing system, the hackers not only can attack the target using the original attack program, but also can attack application programs on different cloud hosts in the cloud computing system, and even other application programs on a same cloud host using the attack program and using a characteristic that many cloud application programs run in the cloud computing system.

In other approaches, a problem that the cloud computing system is attacked is generally resolved by means of traffic detection and traffic cleaning. As shown in FIG. 1, a traffic detection apparatus is added in the cloud computing system, and is connected to a cloud host of the cloud computing system using a switch in order to detect a data flow input to the cloud host in the cloud computing system, where the data flow includes a data flow generated when a user outside the cloud computing system accesses a cloud application, and a data flow generated when cloud hosts in the cloud computing system interact with each other. The traffic detection apparatus collects statistics on a traffic volume of a data flow that is input to a cloud host within preset duration, and when the traffic volume obtained through statistics collection exceeds a preset threshold, the traffic input to the cloud host is considered abnormal. After it is detected that the traffic is abnormal, the traffic detection apparatus may instruct a traffic cleaning apparatus to start. The traffic cleaning apparatus cleans the data flow input to the cloud host, filters an attack packet out, and sends the cleaned data flow to the cloud host.

The solution of the other approaches can prevent only attacks between cloud hosts in a cloud computing system, or external attacks launched on a cloud host in a cloud computing system, but cannot prevent mutual attacks between different cloud applications on a same cloud host, or internal attacks launched on a cloud host. In addition, in the solution of the other approaches, traffic monitoring and cleaning is performed using a cloud host as a unit, which may affect all cloud applications on a target cloud host.

SUMMARY

Embodiments of the present disclosure provide a method and an apparatus for processing an attack behavior of a cloud application in a cloud computing system, and a system, which are used to perform application-level security protection on a cloud computing system, and reduce impact on a normal cloud application in the cloud computing system as much as possible.

According to a first aspect, an embodiment of the present disclosure provides an apparatus for processing an attack behavior of a cloud application in a cloud computing system, including a security analyzer, a security processor, and a policy manager, where the policy manager is configured to store a security determining rule and a malicious application processing rule. The security analyzer is configured to receive application behavior data sent by a security detector on at least one cloud host among multiple cloud hosts in a cloud computing system, determine, according to the application behavior data and the security determining rule that is stored in the policy manager, whether a cloud application running on the at least one cloud host has an attack behavior, and when determining that the cloud application running on the at least one cloud host has an attack behavior, send the application behavior data to the security processor, where the application behavior data is obtained after the security detector on the at least one cloud host detects the cloud application according to a behavior detection rule, and the application behavior data represents a running status of the cloud application, and the security processor is configured to invoke, according to the malicious application processing rule stored in the policy manager, an interface provided by a cloud controller in the cloud computing system in order to process the cloud application having an attack behavior, where the cloud controller is communicatively connected to the cloud hosts in the cloud computing system or is integrated into a cloud host, and is configured to control cloud applications running on cloud the hosts in the cloud computing system.

In a first possible implementation manner of the first aspect, the apparatus further includes an information notifier, where the policy manager is further configured to store an information notification rule. The security analyzer is further configured to acquire initial information of the cloud application, and send the initial information to the security processor when the cloud application has an attack behavior, where the initial information uniquely identifies the cloud application. The security processor is further configured to search, according to the initial information of the cloud application, for user information to which the cloud application belongs, and send the user information and the application behavior data of the cloud application to the information notifier, and the information notifier is configured to store the received application behavior data and user information, and perform attack information notification processing according to the information notification rule stored in the policy manager.

With reference to the first aspect or the first possible implementation manner of the first aspect, in a second possible implementation manner, the policy manager is configured to convert the security determining rule into the behavior detection rule, and deliver the behavior detection rule to the security detector of each of the cloud hosts.

With reference to the first aspect, or either of the first and second possible implementation manners of the first aspect, in a third possible implementation manner, the malicious application is a cloud application having an attack behavior, and the security processor is configured to perform corresponding processing on the cloud application according to a type of the attack behavior of the cloud application, and a manner of processing the type of application that is indicated by the malicious application processing rule, or the security processor is further configured to perform corresponding processing on the cloud application according to a danger level of the attack behavior of the cloud application, and a manner of processing an application having the danger level that is indicated by the malicious application processing rule.

With reference to any one of the first to the third possible implementation manners of the first aspect, in a fourth possible implementation manner, the attack information notification processing includes one of or any combination of generating alarm information, displaying a cloud application having an attack behavior and user information to which the cloud application belongs, and notifying an alarm center of user information to which a cloud application having an attack behavior belongs.

With reference to the first aspect, or any one of the first to the fourth possible implementation manners of the first aspect, in a fifth possible implementation manner, the apparatus for processing an attack behavior of a cloud application is integrated into the cloud controller.

With reference to any one of the first to the fifth possible implementation manners of the first aspect, in a sixth possible implementation manner, the configuration interface of the policy manager includes at least one of a configuration window and an application programming interface.

With reference to the first aspect, or any one of the first to the fifth possible implementation manners of the first aspect, in a seventh possible implementation manner, the behavior detection rule includes a process detection rule or a thread detection rule, and the application behavior data is obtained after the security detector detects a process or a thread of the cloud application according to the behavior detection rule.

With reference to the seventh possible implementation manner of the first aspect, in an eighth possible implementation manner, the security analyzer is further configured to discard the behavior data of the cloud application when the cloud application does not have an attack behavior.

With reference to all of the foregoing possible implementation manners of the first aspect, in a ninth possible implementation manner, the cloud host may be a physical machine, or a virtual machine running on a physical machine.

With reference to any one of the foregoing possible implementation manners of the first aspect, in a tenth possible implementation manner, an application program running on a cloud host is a cloud application, and one or more cloud applications run on each cloud host, where each cloud application is configured to implement a corresponding service function.

With reference to any one of the foregoing possible implementation manners of the first aspect, in an eleventh possible implementation manner, one security detector is deployed on each cloud host, where the security detector is configured to collect, according to the behavior detection rule, behaviors of a cloud application running on the cloud host, generate application behavior data according to a collection result, and report the application behavior data to the security analyzer.

With reference to the eleventh possible implementation manner of the first aspect, in a twelfth possible implementation manner, the security detector reports the application behavior data to the security analyzer periodically, or based on a request, or according to a pre-configured reporting policy.

With reference to any one of the foregoing possible implementation manners of the first aspect, in a thirteenth possible implementation manner, the security determining rule defines which behavior of a cloud application is an attack behavior. The malicious application processing rule defines a manner of processing a cloud application having an attack behavior, and the behavior detection rule indicates a detection indicator used for detecting a cloud application.

With reference to any one of the foregoing possible implementation manners of the first aspect, in a fourteenth possible implementation manner, a cloud application having an attack behavior is defined as a malicious application.

With reference to any one of the third to the fourteenth possible implementation manners of the first aspect, in a fifteenth possible implementation manner, the security analyzer or the security processor is configured to search a pre-configured application feature library according to the behavior data of the cloud application in order to determine a type of the attack behavior of the application, where the application feature library is used to describe a mapping relationship between a behavior feature of an application and a type of an attack behavior of the application.

With reference to the fifteenth possible implementation manner of the first aspect, in a sixteenth possible implementation manner, the application feature library is an independent data set in the cloud computing system or a subset of the security determining rule. After determining, according to the security determining rule, that a cloud application is a malicious application, the security analyzer further determines a type of an attack behavior of the malicious application according to the application feature library included in the security determining rule.

With reference to any one of the third to the sixteenth possible implementation manners of the first aspect, in a seventeenth possible implementation manner, a danger level of a cloud application represents a degree of harm caused to the cloud computing system by the cloud application, and the security analyzer or the security processor is configured to determine a danger level of the attack behavior of the application according to the type of the attack behavior of the application and by searching a mapping table, where the mapping table represents a correspondence between a type of an attack behavior of an application and a danger level of the application.

With reference to any one of the foregoing possible implementation manners of the first aspect, in an eighteenth possible implementation manner, the user information of the cloud application includes but is not limited to one or more of a user name, a user electronic mail (e-mail) address, and a user identity number.

With reference to any one of the foregoing possible implementation manners of the first aspect, in a nineteenth possible implementation manner, the initial information of the cloud application includes either or both of a process identifier (ID) and a process name.

With reference to any one of the foregoing possible implementation manners of the first aspect, in a twentieth possible implementation manner, invoking a cloud controller to process a malicious application includes one of or any combination of closing the malicious application, migrating the malicious application to an isolated cloud host, and disabling a user account of the malicious application.

With reference to any one of the foregoing possible implementation manners of the first aspect, in a twenty-first possible implementation manner, the apparatus for processing an attack behavior of a cloud application is a cloud host in the cloud computing system. The cloud host is a virtual machine running on a physical machine. The physical machine includes a hardware layer, a virtual machine monitor running above the hardware layer, and a host machine and several virtual machines that run above the virtual machine monitor, where the hardware layer includes a processor and a memory. An executable program runs on the cloud host, where the executable program includes a policy manager module, a security analyzer module, a security processor module, and an information notifier module, where the policy manager module is configured to implement functions of the policy manager in any one of the foregoing possible implementation manners, the security analyzer module is configured to implement functions of the security analyzer in any one of the foregoing possible implementation manners, the security processor module is configured to implement functions of the security processor in any one of the foregoing possible implementation manners, and the information notifier module is configured to implement functions of the information notifier in any one of the foregoing possible implementation manners.

With reference to the first aspect or any one of the first to the twentieth possible implementation manners of the first aspect, in a twenty-second possible implementation manner, the apparatus for processing an attack behavior of a cloud application includes at least one processor, a memory, and at least one communications bus, where the communications bus is configured to implement connection and communication between these components, and the memory stores the following elements, executable modules, or data structures, or their subset, or their extended set an operating system, which includes various system programs and is configured to implement various basic services and process a hardware-based task, and an application program module, which includes various cloud applications and is configured to implement various application services, where the application program module includes modules implementing the functions of the policy manager, the security analyzer, the security processor, and the information notifier.

According to a second aspect, an embodiment of the present disclosure provides a method for processing an attack behavior of a cloud application, used in a cloud computing system including multiple cloud hosts, including receiving application behavior data reported by at least one cloud host among the multiple cloud hosts, where the application behavior data is obtained after a security detector on the cloud host detects, according to a behavior detection rule, a cloud application running on the cloud host, and the application behavior data represents a running status of the cloud application running on the cloud host, determining, according to the application behavior data and a security determining rule, whether the cloud application running on the cloud host has an attack behavior, and if the cloud application running on the cloud host has an attack behavior, invoking, according to a malicious application processing rule, an interface provided by a cloud controller in the cloud computing system, to process the cloud application having an attack behavior, where the cloud controller is connected to the cloud host or is integrated into the cloud host, and is configured to control a cloud application running on the cloud host.

In a first possible implementation manner of the second aspect, the method further includes searching, according to initial information of the cloud application having an attack behavior, for user information to which the cloud application belongs if the cloud application running on the cloud host has an attack behavior, where the initial information identifies the cloud application, and storing the application behavior data of the cloud application having an attack behavior and the user information that is obtained through searching, and performing attack information notification processing according to an information notification rule.

With reference to the second aspect or the first possible implementation manner of the second aspect, in a second possible implementation manner, the method further includes discarding the received application behavior data if the cloud application running on the cloud host does not have an attack behavior.

With reference to the second aspect, or either of the first and second possible implementation manners of the second aspect, in a third possible implementation manner, a malicious application is a cloud application having an attack behavior, and invoking an interface provided by a cloud controller in order to perform corresponding processing on the cloud application having an attack behavior includes performing corresponding processing on the cloud application according to a type of the attack behavior of the cloud application, and a manner of processing the type of application that is indicated by the malicious application processing rule, or performing corresponding processing on the cloud application according to a danger level of the attack behavior of the cloud application, and a manner of processing an application having the danger level that is indicated by the malicious application processing rule.

With reference to any one of the first possible implementation manner to the third possible implementation manner of the second aspect, in a fourth possible implementation manner, performing attack information notification processing according to an information notification rule includes one of or of any combination of generating alarm information, displaying a cloud application having an attack behavior and user information to which the cloud application belongs, and notifying an alarm center of user information to which a cloud application having an attack behavior belongs.

With reference to the second aspect or any one of the first to the fourth possible implementation manners of the second aspect, in a fifth possible implementation manner, the method further includes converting the security determining rule into the behavior detection rule, and sending the behavior detection rule to the security detector.

With reference to the second aspect or any one of the first to the fifth possible implementation manners of the second aspect, in a sixth possible implementation manner, one or more of the security determining rule, the malicious application processing rule, and the information notification rule are configured using a configuration interface, where the configuration interface includes at least one of a configuration window and an application programming interface.

With reference to all of the foregoing possible implementation manners of the second aspect, in a seventh possible implementation manner, the cloud host may be a physical machine, or a virtual machine running on a physical machine.

With reference to all of the foregoing possible implementation manners of the second aspect, in an eighth possible implementation manner, an application program running on a cloud host is a cloud application, and one or more cloud applications run on each cloud host, where each cloud application is configured to implement a corresponding service function.

With reference to all of the foregoing possible implementation manners of the second aspect, in a ninth possible implementation manner, one security detector is deployed on each cloud host, where the security detector is configured to collect, according to the behavior detection rule, behaviors of a cloud application running on the cloud host, generate application behavior data according to a collection result, and report the application behavior data to the security analyzer.

With reference to the ninth possible implementation manner of the second aspect, in a tenth possible implementation manner, the security detector reports the application behavior data periodically, or based on a request, or according to a pre-configured reporting policy.

With reference to all of the foregoing possible implementation manners of the second aspect, in an eleventh possible implementation manner, the security determining rule defines which behavior of a cloud application is an attack behavior. The malicious application processing rule defines a manner of processing a cloud application having an attack behavior, and the behavior detection rule indicates a detection indicator used for detecting a cloud application.

With reference to all of the foregoing possible implementation manners of the second aspect, in a twelfth possible implementation manner, a cloud application having an attack behavior is defined as a malicious application.

With reference to any one of the third to the twelfth possible implementation manners of the second aspect, in a thirteenth possible implementation manner, a pre-configured application feature library is searched according to the behavior data of the cloud application in order to determine a type of the attack behavior of the application, where the application feature library is used to describe a mapping relationship between a behavior feature of an application and a type of an attack behavior of the application.

With reference to the thirteenth possible implementation manner of the second aspect, in a fourteenth possible implementation manner, the application feature library is an independent data set in the cloud computing system or a subset of the security determining rule. After it is determined, according to the security determining rule, that a cloud application is a malicious application, a type of an attack behavior of the malicious application is further determined according to the application feature library included in the security determining rule.

With reference to any one of the third to the fourteenth possible implementation manners of the second aspect, in a fifteenth possible implementation manner, a danger level of a cloud application is used to represent a degree of harm caused to the cloud computing system by the cloud application. A danger level of the attack behavior of the application is determined according to the type of the attack behavior of the application and by searching a mapping table, where the mapping table represents a correspondence between a type of an attack behavior of an application and a danger level of the application.

With reference to all of the foregoing possible implementation manners of the second aspect, in a sixteenth possible implementation manner, the user information of the cloud application includes but is not limited to one or more of a user name, a user email address, and a user identity number.

With reference to all of the foregoing possible implementation manners of the second aspect, in a seventeenth possible implementation manner, the initial information of the cloud application includes either or both of a process ID and a process name.

With reference to all of the foregoing possible implementation manners of the second aspect, in an eighteenth possible implementation manner, invoking a cloud controller to process a malicious application includes one of or any combination of the following closing the malicious application, migrating the malicious application to an isolated cloud host, and disabling a user account of the malicious application.

According to a third aspect, an embodiment of the present disclosure provides a security protection system of a cloud application, including an apparatus for processing an attack behavior of a cloud application, a cloud controller, and multiple security detectors, where the multiple security detectors are deployed on multiple cloud hosts, and each of the cloud hosts corresponds to one of the security detectors. The cloud controller is communicatively connected to the multiple cloud hosts, and is configured to manage and control the multiple cloud hosts, and one or more cloud applications run on each of the cloud hosts, and the apparatus for processing an attack behavior of a cloud application stores a security determining rule and a malicious application processing rule. Each of the security detectors is configured to detect one or more cloud applications according to a behavior detection rule in order to obtain application behavior data, and report the application behavior data to the apparatus for processing an attack behavior of a cloud application, where the one or more cloud applications run on a cloud host corresponding to the security detector, and the apparatus for processing an attack behavior of a cloud application is configured to receive the application behavior data reported by a security detector on at least one cloud host among the multiple cloud hosts, determine, according to the application behavior data and the security determining rule, whether a cloud application running on the cloud host has an attack behavior, and if the cloud application running on the cloud host has an attack behavior, invoking, according to the malicious application processing rule, an interface provided by the cloud controller in order to perform corresponding processing on the cloud application having an attack behavior.

In a first possible implementation manner of the third aspect, the apparatus for processing an attack behavior of a cloud application is further configured to convert the security determining rule into the behavior detection rule, and deliver the behavior detection rule to the security detector of each of the cloud hosts.

With reference to the third aspect, or the first possible implementation manner of the third aspect, in a second possible implementation manner, the apparatus for processing an attack behavior of a cloud application is further configured to discard the received application behavior data if the cloud application running on the cloud host does not have an attack behavior.

With reference to the third aspect or the first possible implementation manner of the third aspect, in a third possible implementation manner, the apparatus for processing an attack behavior of a cloud application is further configured to display the cloud application having an attack behavior and user information to which the cloud application belongs, or notify an alarm center of user information to which the cloud application having an attack behavior belongs if the cloud application running on the cloud host has an attack behavior.

With reference to the third aspect or any one of the first to the third possible implementation manners of the third aspect, in a fourth possible implementation manner, the apparatus for processing an attack behavior of an application is communicatively connected to the cloud controller, or the apparatus for processing an attack behavior of a cloud application is integrated into the cloud controller.

With reference to the third aspect, or any one of the first to the fourth possible implementation manners of the third aspect, in a fifth possible implementation manner, a malicious application is a cloud application having an attack behavior, and the apparatus for processing an attack behavior of a cloud application is configured to perform corresponding processing on the cloud application according to a type of the attack behavior of the cloud application, and a manner of processing the type of application that is indicated by the malicious application processing rule, or perform corresponding processing on the cloud application according to a danger level of the attack behavior of the cloud application, and a manner of processing an application having the danger level that is indicated by the malicious application processing rule.

With reference to the third aspect or any one of the first to the fifth possible implementation manners of the third aspect, in a sixth possible implementation manner, one or more of the security determining rule, the malicious application processing rule, and the information notification rule are configured using a configuration interface, where the configuration interface includes at least one of a configuration window and an application programming interface.

With reference to the third aspect, or any one of the first to the sixth possible implementation manners of the third aspect, in a seventh possible implementation manner, the behavior detection rule includes a process detection rule or a thread detection rule, and the application behavior data is obtained after the security detector detects a process or a thread of the cloud application according to the behavior detection rule.

With reference to the third aspect, or any one of the first to the seventh possible implementation manners of the third aspect, in an eighth possible implementation manner, the security determining rule defines which behavior of a cloud application is an attack behavior. The malicious application processing rule defines a manner of processing a cloud application having an attack behavior, and the behavior detection rule indicates a detection indicator used for detecting a cloud application.

With reference to the third aspect or any one of the first to the eighth possible implementation manners of the third aspect, in a ninth possible implementation manner, the apparatus for processing an attack behavior of an application is configured to search a pre-configured application feature library according to the behavior data of the cloud application in order to determine a type of the attack behavior of the application, where the application feature library describes a mapping relationship between a behavior feature of an application and a type of an attack behavior of the application.

With reference to the ninth possible implementation manner of the third aspect, in a tenth possible implementation manner, the application feature library is an independent data set in the cloud computing system or a subset of the security determining rule, and the apparatus for processing an attack behavior of an application is configured to determine a type of an attack behavior of the malicious application according to the application feature library included in the security determining rule after determining, according to the security determining rule, that a cloud application is a malicious application.

With reference to any one of the fifth to the tenth possible implementation manner of the third aspect, in an eleventh possible implementation manner, a danger level of a cloud application represents a degree of harm caused to the cloud computing system by the cloud application, and the apparatus for processing an attack behavior of an application is configured to determine a danger level of the attack behavior of the application according to the type of the attack behavior of the application and by searching a mapping table, where the mapping table represents a correspondence between a type of an attack behavior of an application and a danger level of the application.

In the method and apparatus for processing an attack behavior of a cloud application, and the system that are provided in the embodiments of the present disclosure, a policy manager delivers a behavior detection rule to a security detector on each cloud host, the security detector performs detection according to the behavior detection rule, and reports behavior data of an application, a security analyzer analyzes the behavior data of the application to determine an application having an attack behavior, and invokes a cloud controller to perform corresponding processing. Compared with the security solution of other approaches, the embodiments of the present disclosure perform security protection based on an application level of cloud computing, which can satisfy an application deployment scenario of a cloud computing system, prevent mutual attacks between different applications on a same host, or an internal attack launched on a host, and reduce impact on a normal application.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art understand the technical solutions in the present disclosure better, the following describes the technical solutions in the embodiments of the present disclosure with reference to the accompanying drawings in the embodiments of the present disclosure. The described embodiments are merely some rather than all of the embodiments of the present disclosure.

Figure 1:
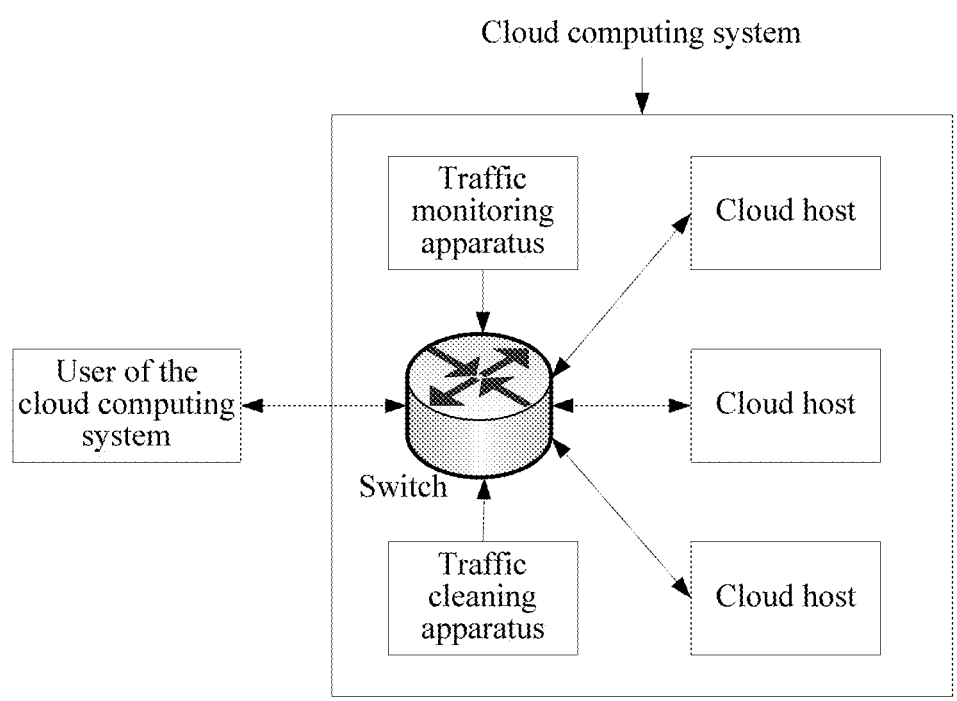
FIG. 1 is a schematic diagram of a principle of a method for processing an attack in a cloud processing system.
Figure 2:
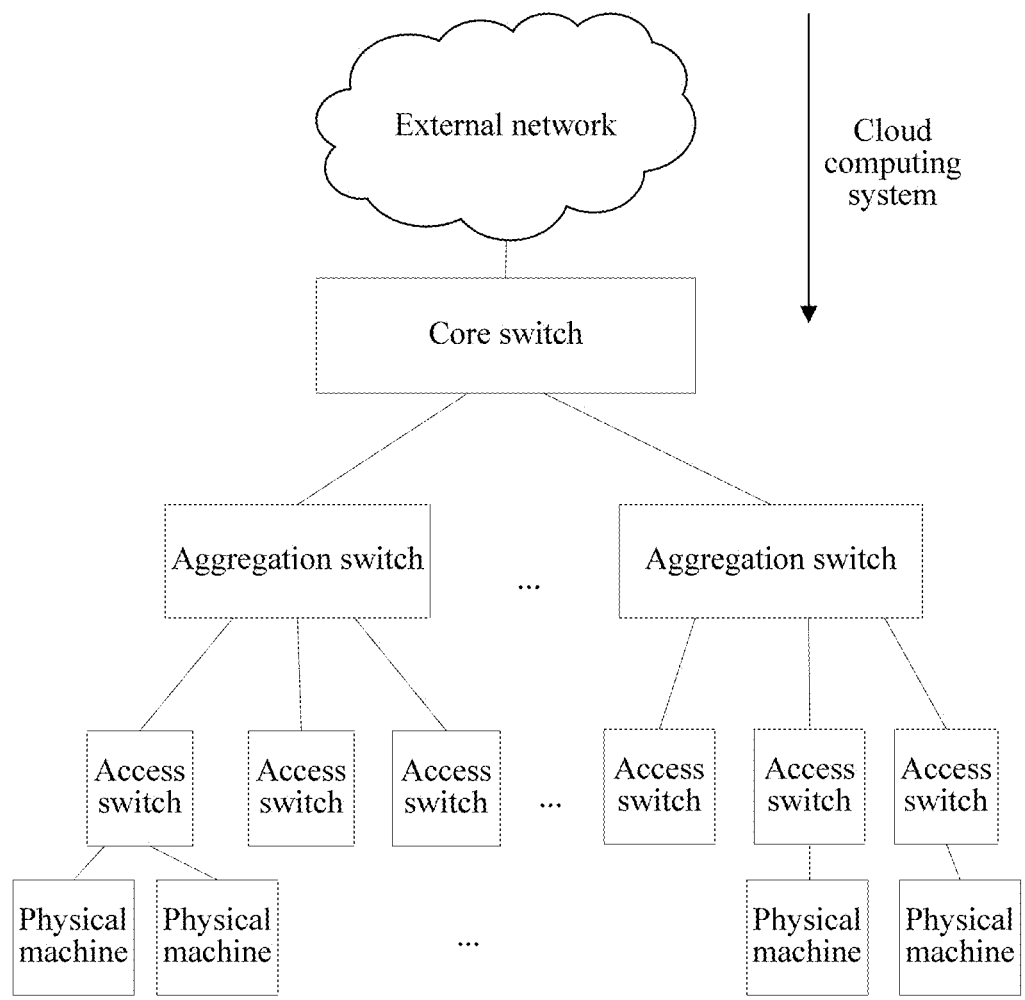
FIG. 2 is a diagram of an architecture of a cloud computing system according to an embodiment of the present disclosure.

The technical solutions provided in the embodiments of the present disclosure may be typically applied in a cloud computing system (briefly referred to as a cloud system), where the cloud computing system may be viewed as a cluster system in which distributed computing, storage, and management are performed in general hardware, and the cloud computing system can provide high-throughput data access, and can be applied in large-scale data computing and storage. FIG. 2 shows a physical architecture of a cloud computing system. The cloud computing system generally includes multiple physical computers (which may be briefly referred to as physical machines) that are interconnected using a switch (designated as access switch), and these physical machines may be interconnected with an external network using an aggregation switch and a core switch. A physical machine may be further a physical entity such as a computer or a server. In some networking scenarios, one physical machine in the cloud computing system may be referred to as one cloud host. With the development of cloud computing technologies, currently, one or more virtual machines may be simulated on one physical computer using virtual machine software, and these virtual machines may work as real computers. An operating system and an application program may be installed on a virtual machine, and the virtual machine may access network resources, and the like. An application program runs on a virtual machine like working on a real computer. Therefore, one cloud computing system may include thousands of virtual machines, and an application program may independently run on each virtual machine. Therefore, in some other more general networking scenarios, a virtual machine in a cloud computing system is generally referred to as a cloud host or a virtual cloud host, and an application program running on a cloud host is referred to as a cloud application. Therefore, the cloud host described in all embodiments of the present disclosure is not limited to a virtual machine or a physical machine, and depends on a specific networking scenario. In addition, the cloud computing system further includes a cloud controller configured to control and manage a cloud host in the cloud computing system. The cloud controller may be one of several virtual machines included in the cloud computing system. In some cases, the cloud controller may also be an independent physical machine. Certainly, there may be one or more cloud controllers. A cloud controller is communicatively connected to a cloud host in the cloud computing system or is integrated into a cloud host, and is configured to control cloud applications running on multiple cloud hosts in the cloud computing system. The solutions in the embodiments of the present disclosure may be implemented by a cloud host in the cloud computing system, and in some cases, may be implemented by a cloud controller. According to a logical architecture, the cloud computing system is generally divided into an infrastructure and virtualization layer (an IaaS layer), a platform layer (a PaaS layer), and an application layer (an SaaS layer). The solutions in the embodiments of the present disclosure may be implemented by the platform layer of the cloud computing system, and may be further implemented by a cloud controller or another independent function unit at the platform layer.

Figure 3:
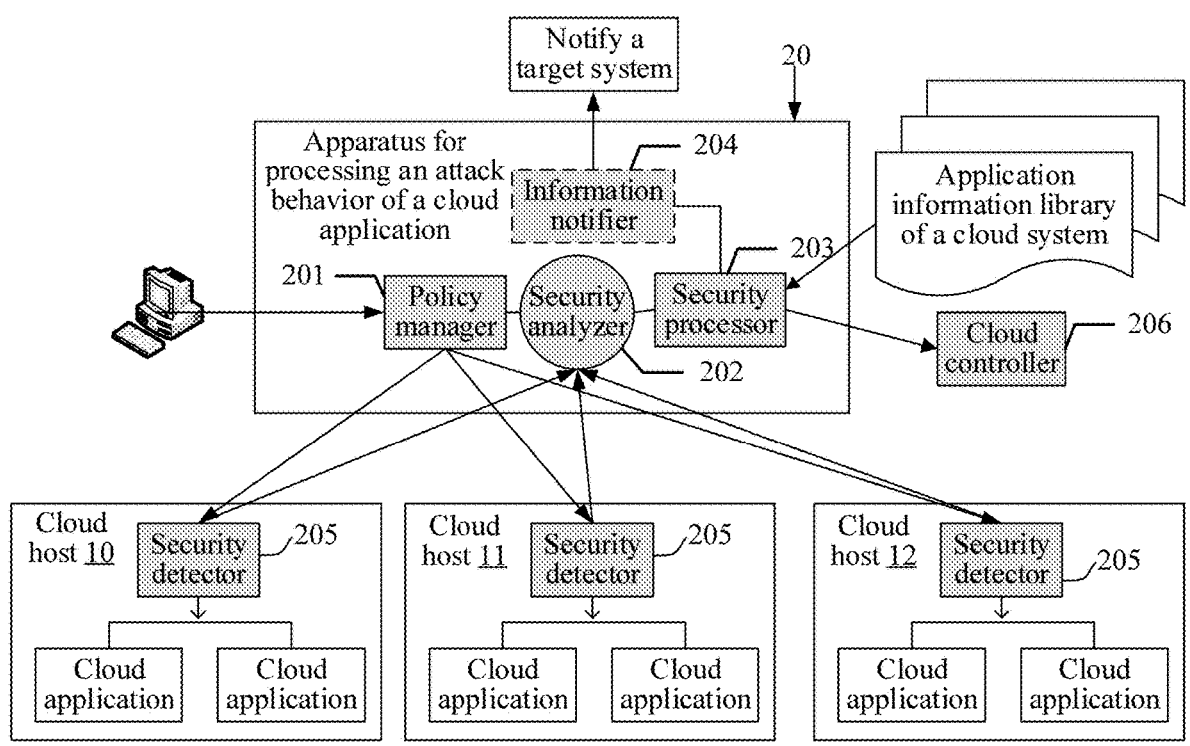
FIG. 3 is a schematic diagram of an apparatus for processing an attack behavior of a cloud application according to an embodiment of the present disclosure.

An embodiment of the present disclosure provides an apparatus for processing an attack behavior of a cloud application, where the processing apparatus may be applied to a cloud computing system in order to perform security protection on the cloud computing system. FIG. 3 is a schematic diagram of the apparatus for processing an attack behavior of a cloud application according to this embodiment of the present disclosure. In a specific embodiment, the processing apparatus may be a cloud host in the cloud computing system, or may be used as a function unit in a cloud controller and integrated into the cloud controller. According to FIG. 3, the cloud computing system includes an apparatus for processing an attack behavior of a cloud application 20, a cloud controller 206, and multiple cloud hosts (for example, cloud hosts 10, 11, and 12 in FIG. 3). One or more cloud applications run on each of the cloud hosts 10, 11, and 12, and one security detector 205 is deployed on each of the cloud hosts, and is responsible for collecting, according to a behavior detection rule delivered by the apparatus for processing an attack behavior of a cloud application 20, behaviors of a cloud application running on the cloud host 10, 11, and 12, and reporting application behavior data of the application to the apparatus for processing an attack behavior of a cloud application 20, where the application behavior data represents a running status of the cloud application, for example, Transmission Control Protocol (TCP) link information, network traffic information, a quantity of times of system invoking that are of the cloud application. Optionally, the application behavior data of the cloud application may be reported periodically or based on a request. Further, the apparatus for processing an attack behavior of a cloud application 20 includes a policy manager 201, a security analyzer 202, and a security processor 203.

The policy manager 201 is mainly configured to store, convert, and deliver a rule. Further, the policy manager 201 may store a security determining rule and a malicious application processing rule, where the security determining rule defines which behavior of a cloud application is an attack behavior, and the malicious application processing rule defines a manner of processing a cloud application having an attack behavior. In an embodiment, the policy manager 201 may convert the security determining rule into the behavior detection rule, where the behavior detection rule defines which behavior of a cloud application is to be detected, that is, the behavior detection rule indicates a detection indicator for detecting a cloud application. Generally, the behavior detection rule is closely related to the security determining rule, and therefore, they can be mutually converted. For example, if the security determining rule includes that if a quantity of external TCP ports requested by a cloud application exceeds 100, it is determined that the cloud application has a port sniffing behavior. Correspondingly, the behavior detection rule includes collecting a quantity of different TCP ports requested by the cloud application. In this way, the security detector on the cloud host should detect the quantity of different TCP ports requested by the cloud application, and report a detection result to the security analyzer 202, and the security analyzer 202 can determine whether the cloud application has a port sniffing behavior.

The security analyzer 202 is mainly configured to receive application behavior data that is reported by a security detector 205 on at least one cloud host 10, 11, and 12 in the cloud computing system, and then, determine, according to the security determining rule stored in the policy manager 201, whether the cloud application on the cloud host 10, 11, and 12 has an attack behavior, if the cloud application has an attack behavior, send initial information of the cloud application having an attack behavior to the security processor 203, where the initial information of the cloud application uniquely identifies the cloud application. For example, in a specific embodiment, the initial information may be a process ID or a process name, or include both. Optionally, the security detector 205 may report the application behavior data of the cloud application periodically, or based on a request, or according to a pre-configured reporting policy, which is not limited in this embodiment of the present disclosure.

After receiving the initial information of the cloud application having an attack behavior that is sent by the security analyzer 202, the security processor 203 is mainly configured to invoke, according to the malicious application processing rule stored in the policy manager 201, an interface provided by the cloud controller 206 in order to process the cloud application having an attack behavior (in this embodiment of the present disclosure, a cloud application having an attack behavior is referred to as a malicious application). In an embodiment, the security processor 203 may process all malicious applications together, for example, closing the malicious applications, migrating the malicious applications to an isolated cloud host, or disabling a user account of the malicious applications. Optionally, the security processor 203 may also perform different degrees of processing or different types of processing on the malicious applications according to types of attack behaviors of the malicious applications or danger levels of attack behaviors of the malicious applications. For example, a malicious application having a relatively low danger level may be migrated or isolated, and a user account and the like of a malicious application having a high danger level may be disabled. It may be understood that, in this case in order to determine a type or a danger level of an attack behavior of a malicious application, the security analyzer 202 needs to report application behavior data and initial information of the malicious application to the security processor 203 such that the security processor 203 determines a type or a danger level of the attack behavior of the malicious application according to the behavior data of the malicious application. Certainly, the security analyzer 202 may also determine the type or the danger level of the attack behavior of the application according to the behavior data of the application, and feeds back an analysis result to the security processor 203, which is not limited in this embodiment of the present disclosure. For example, the security analyzer 202 may distinguish a malicious application from a normal application according to the behavior data of the cloud application and the security determining rule, and then, the security analyzer 202 or the security processor 203 may further search a pre-configured application feature library in order to determine a type of an attack behavior of the malicious application, for example, denial-of-service attack, Trojan attack, or worm attack. For another example, after the security analyzer 202 determines, according to the behavior data of the cloud application and the security determining rule, the malicious application having an attack behavior, the security analyzer 202 or the security processor 203 may search a pre-configured application feature library according to the behavior data of the cloud application in order to determine a type of the attack behavior of the application, and further, determine a danger level of the attack behavior of the application according to the type of the attack behavior of the application, where the application feature library describes a mapping relationship between a behavior feature of an application and a type of an attack behavior of the application. Optionally, the application feature library may be an independent data set in the cloud computing system, and after determining, according to the behavior data of the cloud application and the security determining rule, the malicious application having an attack behavior, the security analyzer 202 may further search the application feature library to determine the type of the attack behavior of the malicious application. Certainly, the application feature library may also be a subset of the security determining rule, and after determining, according to the security determining rule, that a cloud application is a malicious application, the security analyzer 202 may further determine a type of an attack behavior of the malicious application according to the application feature library included in the security determining rule. It may be understood that, different types of attack behaviors have different danger levels, and a danger level needs to be determined according to a degree of harm caused to the system by an attack behavior. An attack behavior causing severer harm to the cloud computing system has a higher danger level. Generally, a mapping table may be configured to represent a correspondence between a type of an attack behavior of an application and a danger level of the application. In this way, the danger level of the attack behavior of the application may be determined according to the type of the attack behavior of the application and by searching the table. Optionally, in another optional embodiment, the security processor 203 may also process a malicious application according to a security level of the cloud computing system, where different security levels correspond to different processing manners. For example, the security level of the cloud computing system may set to "high," "medium," and "low." When the security level of the cloud computing system is "high," the security processor 203 may close the malicious application, and disable a user account of the malicious application. When the security level of the cloud computing system is "low," the security processor 203 may migrate the malicious application to a specific cloud host to isolate the malicious application. Finally, it should be noted that, three manners in which the security processor 203 processes malicious applications, that is, processing the malicious applications together, processing the malicious applications according to types or danger levels of attack behaviors, and processing the malicious applications according to a security level of the cloud computing system, may be indicated by a malicious application processing rule. Different processing manners correspond to different malicious application processing rules, and the malicious application processing rules may be configured by an administrator using a configuration interface of the policy manager 201. For example, the malicious application processing rules may indicate manners of processing different types of malicious applications, or manners of processing malicious applications having different danger levels, or manners of processing malicious applications under different security levels of the cloud computing system. In this way, the security processor 203 may perform corresponding processing on a malicious application according to a type of an attack behavior of the application, and a manner of processing the type of application that is indicated by the malicious application processing rule, the security processor 203 may perform corresponding processing on the malicious application according to a danger level of the attack behavior of the application, and a manner of processing an application having the danger level that is indicated by the malicious application processing rule, or the security processor 203 may perform corresponding processing on the malicious application according to a current security level of the cloud computing system, and a manner of processing a malicious application under the security level that is indicated by the malicious application processing rule.

In the apparatus for processing an attack behavior of a cloud application provided in this embodiment of the present disclosure, a policy manager 201 delivers a behavior detection rule to a security detector 205 on each cloud host 10, 11, and 12, the security detector 205 performs detection according to the behavior detection rule, and reports behavior data of a cloud application, a security analyzer 202 analyzes the behavior data of the cloud application to determine a cloud application having an attack behavior, and invokes a cloud controller 206 to perform corresponding processing. Compared with the security solution of other approaches, this embodiment of the present disclosure performs security protection based on an application level of cloud computing, which can satisfy an application deployment scenario of a cloud computing system, prevent mutual attacks between different cloud applications on a same host, or an internal attack launched on a host, and reduce impact on a normal cloud application. Further, a malicious application processing policy may be configured in order to further differentially process malicious applications according to different security levels or different attack types.

Preferably, the apparatus for processing an attack behavior of a cloud application 20 may further include an information notifier 204. The policy manager 201 further stores an information notification rule.

The security processor 203 is further configured to search, according to the initial information of the cloud application having an attack behavior, for user information to which the cloud application belongs, and send the user information obtained through searching and the behavior data of the cloud application to the information notifier 204, where the user information of the cloud application includes but is not limited to a user name, a user e-mail address, and a user identity number.

The information notifier 204 is configured to store the received application behavior data and the received user information to which the cloud application belongs, and perform attack information notification processing according to the information notification rule stored in the policy manager 201. The application behavior data and the user information to which the cloud application belongs are backed up. Further, the application behavior data and the user information are stored into a reliable storage medium in a data format such as a table, a log, or a document such that the administrator can view them.

Further, in an embodiment, that the information notifier 204 performs attack information notification processing includes but is not limited to one or more of generating alarm information, displaying a cloud application having an attack behavior and user information to which the cloud application belongs, and notifying an alarm center of user information to which a cloud application having an attack behavior belongs.

Preferably, in another embodiment, after receiving the application behavior data reported by the security detector 205, and when determining, according to the security determining rule, that the cloud application does not have an attack behavior, the security analyzer 202 may discard the application behavior data.

Preferably, in another embodiment, the policy manager 201 includes a configuration interface, and the administrator may configure one or more of the security determining rule, the malicious application processing rule, and the information notification rule using the configuration interface. The configuration interface may be one or more of a graphical user interface (GUI), a configuration window in a form of a web page, and an application programming interface (API). Further, during configuration of a malicious application processing rule, different processing rules may be configured according to attack types or danger levels of malicious applications in order to differentially process the malicious applications, thereby implementing flexibility and scalability of security protection. Certainly, it may be understood that one or more of the three rules may not be configured by the administrator, and may be defined by the cloud computing system according to a default rule.

Further, in order to implement finer-granularity security protection, the behavior detection rule delivered to the security detector 205 by the policy manager 201 may include a process detection rule or a thread detection rule. In this way, the security detector may perform process-level or thread-level detection on a cloud application. The security analyzer 202 may determine, based on a detection result of the security detector 205, a process or thread having an attack behavior, and then, the security processor 203 may process the process or thread having an attack behavior, to further implement process-level or thread-level security protection.

Figure 4:
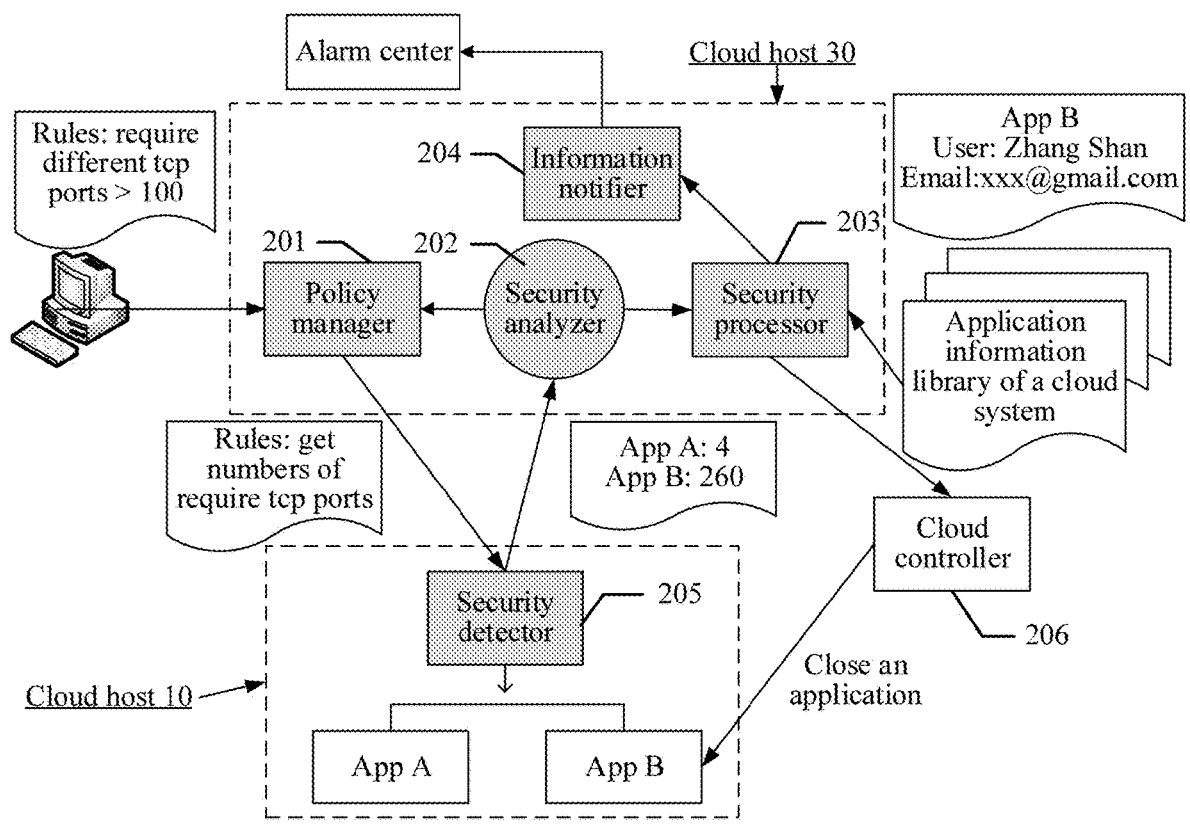
FIG. 4 is a schematic diagram of an apparatus for processing an attack behavior of a cloud application according to an embodiment of the present disclosure.

With reference to a specific example, the following further describes in detail the apparatus for processing an attack behavior of a cloud application provided in this embodiment of the present disclosure. As shown in FIG. 4, the apparatus for processing an attack behavior of a cloud application is a cloud host 30. A main working process of the cloud host 30 is as follows.

1. Configure, using the configuration interface of the policy manager 201, a security determining rule used to determine an attack behavior of an application, where the configuration action may be implemented by an administrator or a configuration program running in the cloud computing system. In a specific example, the security determining rule includes, require different tcp port>100, that is, a quantity of requested TCP ports exceeds 100, where the determining rule represents that if a quantity of external TCP ports requested by the cloud application exceeds 100, it is determined that the cloud application has a port sniffing behavior.

2. The policy manager 201 converts the security determining rule into a behavior detection rule, detects a quantity of TCP ports requested by the cloud application, and delivers the behavior detection rule to the security detector 205 deployed on the cloud host 10.

3. The security detector 205 detects behaviors of an App A and an App B. For example, the security detector 205 counts a quantity of TCP ports requested by the App A and a quantity of TCP ports requested by the App B, generates application behavior data, and reports the application behavior data to the security analyzer 202.

4. The security analyzer 202 determines, according to the collected application behavior data and the security determining rule, that the quantity of TCP ports requested by the App B exceeds 100, and therefore, determines that the App B has an attack behavior.

5. The security analyzer 202 sends initial information of the App B, for example, a process ID or a process name, to the security processor 203.

6. The security processor 203 searches an application library of the cloud computing system according to the initial information of the App B for user information of the App B.

7. The security processor 203 invokes the cloud controller 206 to close the App B, or migrate the App B to an isolated cloud host, or disable a user account of the App B.

8. The security analyzer 202 notifies the information notifier 204 of the user information of the App B, and the information notifier 204 reports the user information to the alarm center for filing.

In this example, the apparatus for processing an attack behavior of a cloud application successfully detects and processes a port sniffing behavior of the App B, which does not severely affect the App A. Further, after finding that the App B has an attack behavior, the security analyzer may further set different processing manners for the App B according to a type or a danger level of the attack behavior of the App B. A manner of processing a malicious application may be indicated by a malicious application processing rule, and the malicious application processing rule may be configured by the administrator using the configuration interface of the policy manager 201. The configuration interface may be a web page, an API, or the like.

The following describes in detail the modules in the apparatus for processing an attack behavior of a cloud application 20 shown in FIG. 3.

Figure 5:
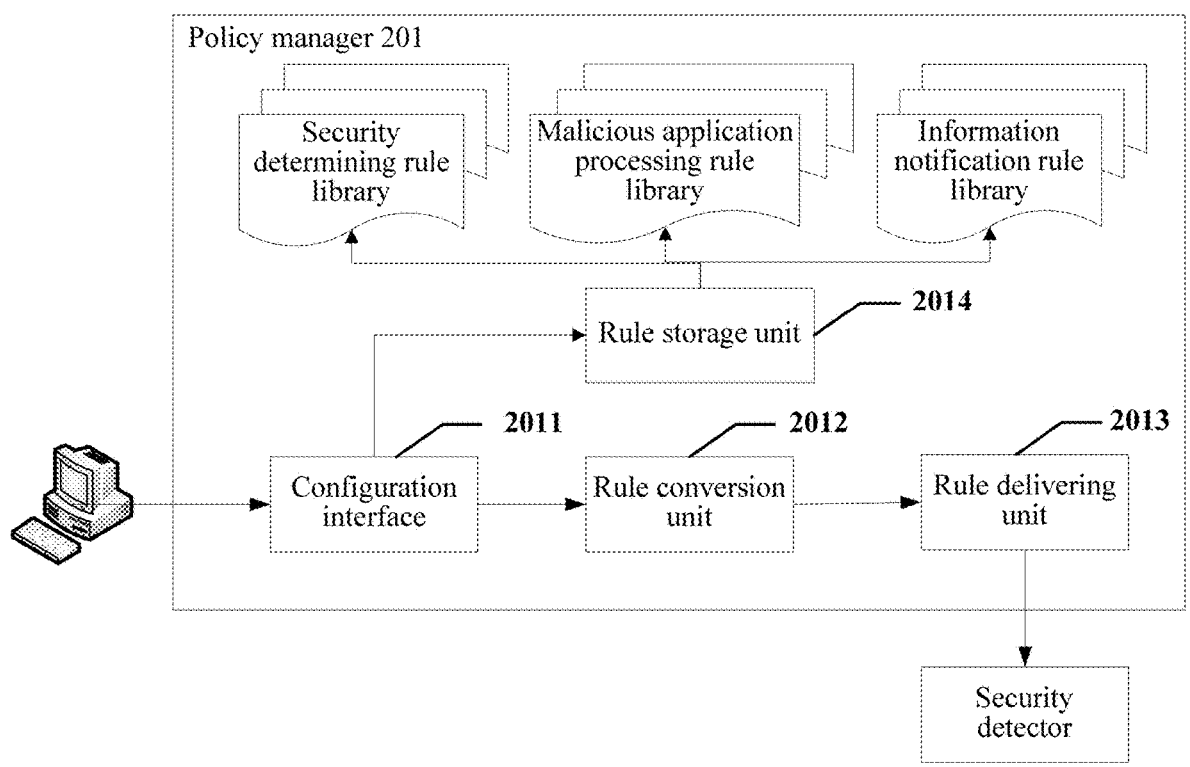
FIG. 5 is a schematic structural diagram of a policy manager according to an embodiment of the present disclosure.

(1) The policy manager 201: The policy manager 201 provides a configuration interface for the administrator or an automatic configuration program, and is mainly responsible for operations such as rule storage, rule conversion, and rule delivering. As shown in FIG. 5, the policy manager 201 includes a configuration interface 2011, a rule conversion unit 2012, a rule delivering unit 2013, and a rule storage unit 2014, where the configuration interface 2011 includes but is not limited to one or more of a GUI, a configuration window in a form of a web page, and an API. The rule that can be configured using the configuration interface 2011 includes the security determining rule, the malicious application processing rule, and an information notification rule. The rule storage unit 2014 may store, into corresponding rule libraries, such as a security determining rule library, the malicious application processing rule library, and an information notification rule library, various rules configured by the administrator using the configuration interface 2011. The rule conversion unit 2012 may convert the security determining rule configured by the administrator into the behavior detection rule, and the rule delivering unit 2013 is responsible for delivering the behavior detection rule to the security detector on the cloud host.

Figure 6:
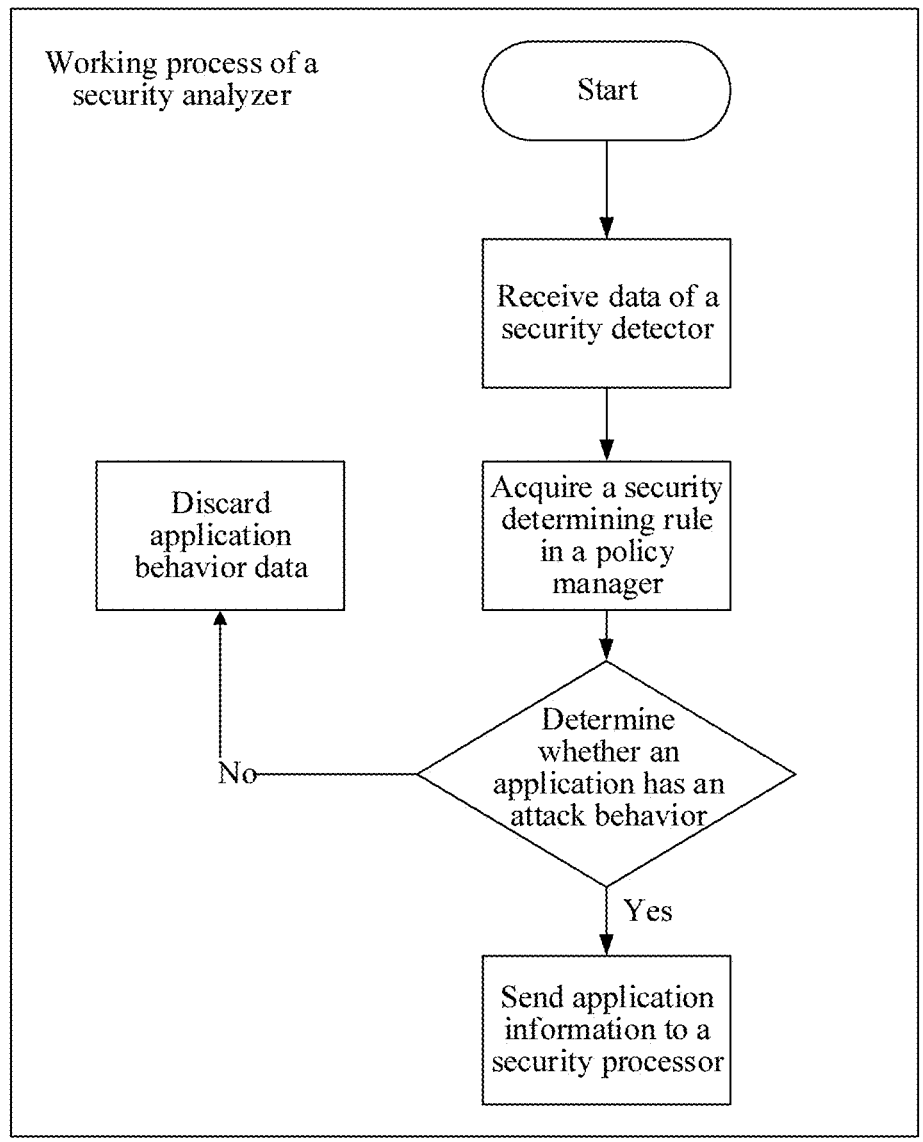
FIG. 6 is a working flowchart of a security analyzer according to an embodiment of the present disclosure.

(2) The security analyzer 202: As shown in FIG. 6, the security analyzer 202 is mainly responsible for receiving the application behavior data from the security detector, and then, determining, according to the security determining rule stored in the policy manager, whether the cloud application has an attack behavior, and if the cloud application has an attack behavior, sending the initial information (for example, the process ID or the process name) of the cloud application to the security processor, or if the cloud application does not have an attack behavior, discarding the application behavior data.

Figure 7:
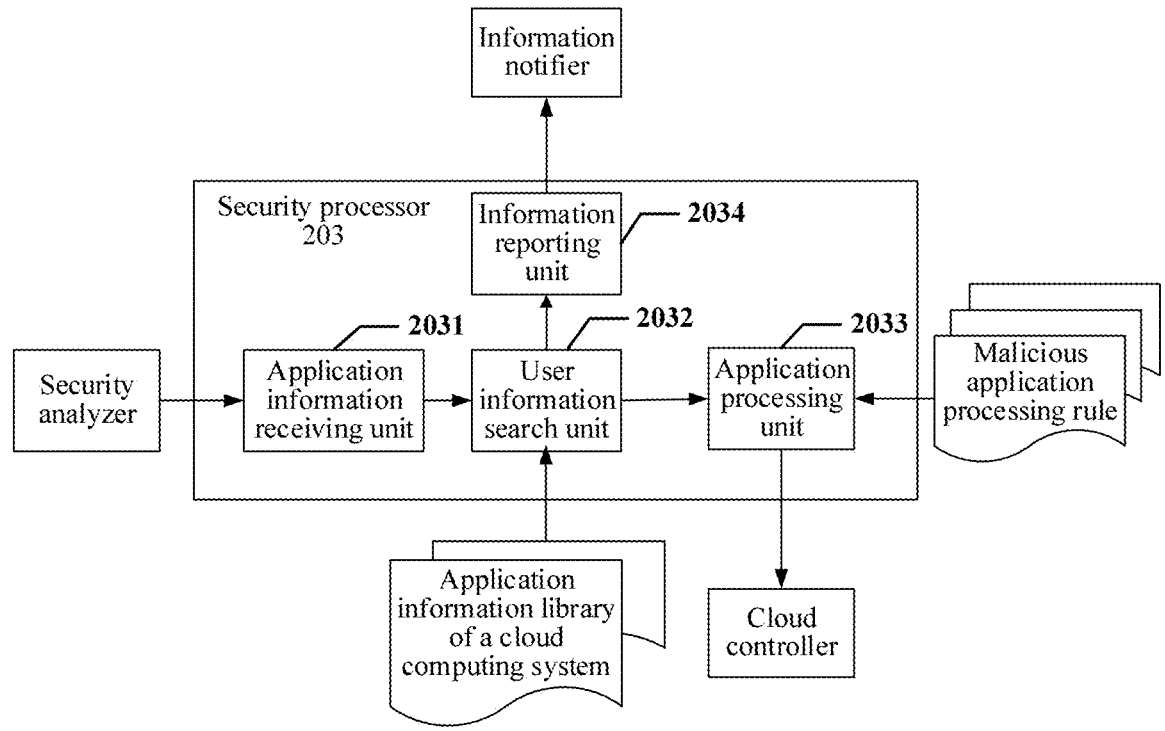
FIG. 7 is a schematic structural diagram of a security processor according to an embodiment of the present disclosure.

(3) The security processor 203: The security processor 203 is responsible for processing a malicious application. Further, as shown in FIG. 7, the security processor 203 mainly includes an application information receiving unit 2031, a user information search unit 2032, an application processing unit 2033, and an information reporting unit 2034, where the application information receiving unit 2031 receives initial information of a malicious application that is reported by the security analyzer. The user information search unit 2032 searches an application information library of the cloud computing system for user information to which the cloud application belongs, where the user information includes but is not limited to a user name, a user e-mail address, and a user identity. Then, the user information search unit 2032 reports the user information and the behavior information of the malicious application to the information notifier using the information reporting unit 2034 such that the information notifier performs attack information notification processing according to the information notification rule stored in the policy manager, and the application processing unit 2033 invokes, according to the malicious application processing rule stored in the policy manager, the interface provided by the cloud controller in order to process the malicious application, where a processing manner includes but is not limited to closing the application, migrating the application to an isolated cloud host, and disabling a user account.

Figure 8:
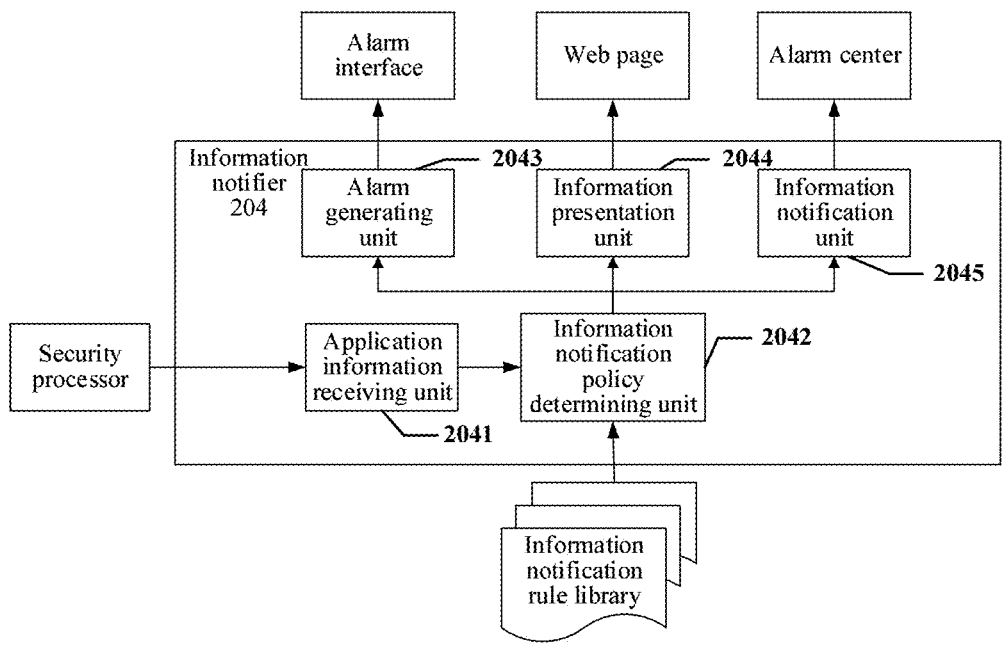
FIG. 8 is a schematic structural diagram of an information notifier according to an embodiment of the present disclosure.

(4) The information notifier 204: As shown in FIG. 8, the information notifier 204 includes an application information receiving unit 2041 and an information notification policy determining unit 2042, where the application information receiving unit 2041 is responsible for receiving the application behavior information and the user information to which the cloud application belongs from the security processor, and then, the information notification policy determining unit 2042 performs attack information notification processing according to the information notification rule stored in the policy manager. Further, the information notification policy determining unit 2042 may invoke or trigger an alarm generating unit 2043 to generate alarm information, for example, generate an alarm interface. Optionally, the information notification policy determining unit 2042 may invoke or trigger an information presentation unit 2044 to present information about the malicious application in a web page in a form of a table. Optionally, the information notification policy determining unit 2042 may also invoke or trigger the information notification unit 2045 to report the information about the malicious application to an alarm center. It may be understood that, the information notifier 204 may further include one of the alarm generating unit 2043, the information presentation unit 2044, and the information notification unit 2045, or may include any two of the three units, or may include all of the three units, which depends on a specific application scenario requirement, and is not limited in this embodiment of the present disclosure.

The apparatus for processing an attack behavior of a cloud application provided in this embodiment of the present disclosure can satisfy an application deployment scenario of a cloud computing system, perform security protection based on an application level of cloud computing, prevent mutual attack between different cloud applications on a same host, or internal attacks launched on a host, and reduce impact on a normal cloud application. Further, a malicious application processing policy may be configured in order to further differentially process malicious applications according to different security levels or different attack types.

Figure 12:
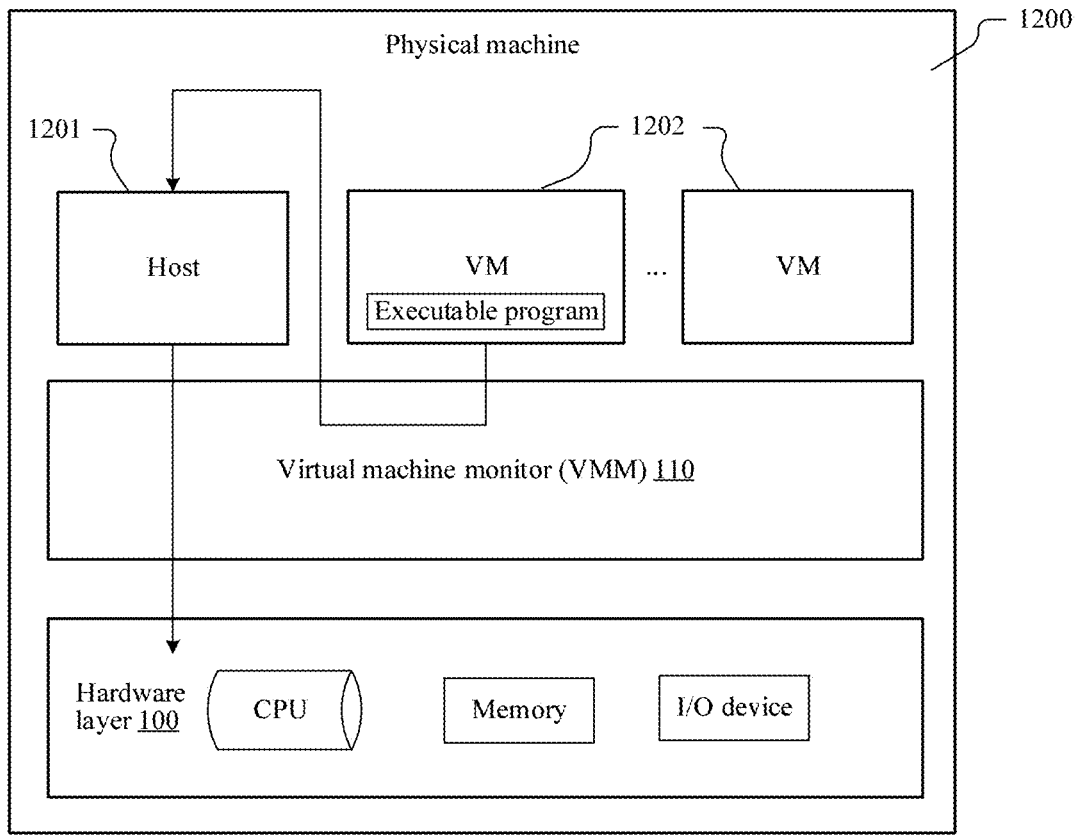
FIG. 12 is a schematic diagram of a physical machine for processing an attack behavior of a cloud application according to an embodiment of the present disclosure.
Figure 13:
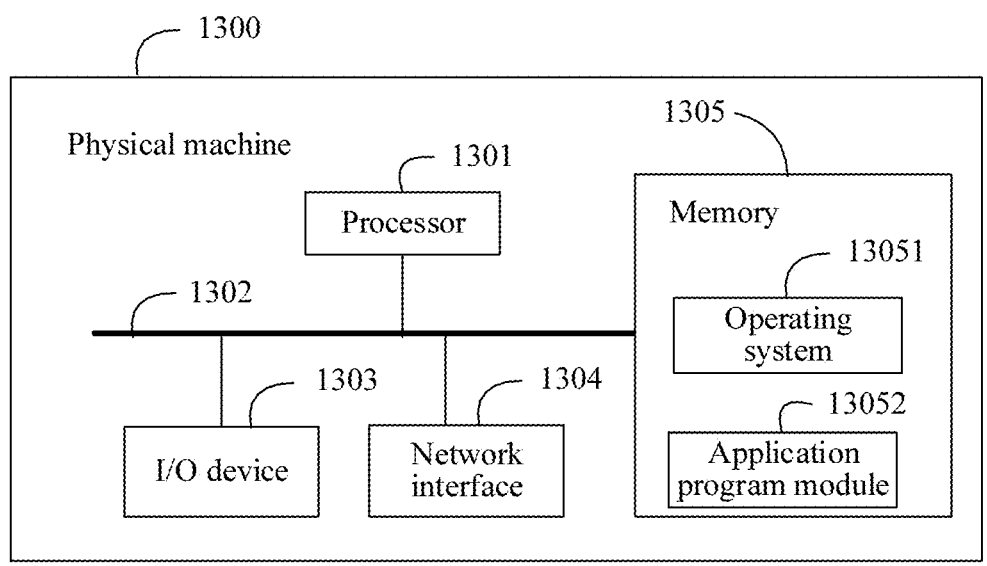
FIG. 13 is a schematic diagram of a physical machine for processing an attack behavior of a cloud application according to an embodiment of the present disclosure.

It should be noted that, the apparatus for processing an attack behavior of a cloud application provided in this embodiment of the present disclosure may be a cloud host in the cloud computing system, where the cloud host may be a virtual machine running on a physical machine. As shown in FIG. 12, the physical machine 1200 includes a hardware layer 100, a Virtual Machine Monitor (VMM) 110 running above the hardware layer 100, and a Host 1201 and several virtual machines (VMs) 1202 that run above the VMM 100, where the hardware layer 100 includes but is not limited to an Input/Output (I/O) device, a CPU, and a memory. The apparatus for processing an attack behavior of a cloud application provided in this embodiment of the present disclosure may be a virtual machine in the physical machine 1200. For example, the VM 1202 on which one or more cloud applications run, where each cloud application implements a corresponding service function, for example, a database application and a map application. The one or more cloud applications may be developed by a developer and is then deployed in the cloud computing system. In addition, the VM 1202 further runs an executable program, and invokes hardware resources of the hardware layer 100 using the host 1201 when running the program in order to implement functions of the policy manager, the security analyzer, the security processor, and the information notifier of the apparatus for processing an attack behavior of a cloud application. Further, the policy manager, the security analyzer, the security processor, and the information notifier may be included in the executable program in a form of software modules or functions. For example, the executable program may include a policy manager module, a security analyzer module, a security processor module, and an information notifier module. The VM 1202 invokes the resources at the hardware layer 100, such as the CPU and the memory in order to run the executable program, thereby implementing functions of the policy manager, the security analyzer, the security processor, and the information notifier. In another possible scenario, the apparatus for processing an attack behavior of a cloud application provided in this embodiment of the present disclosure may be a physical machine in the cloud computing system. As shown in FIG. 13, the physical machine 1300 includes at least one processor 1301, for example, a CPU, at least one network interface 1304, a memory 1305, and at least one communications bus 1302. The communications bus 1302 is configured to implement connection and communication between the components. Optionally, the physical machine 1300 includes an I/O device 1303, where the I/O device 1303 includes a display, a keyboard, or a clicking device (for example, a mouse, or a trackball), a touch panel, or a touch display screen). The memory 1305 may include a high speed random access memory (RAM), or may also include a non-volatile memory, for example, at least one magnetic memory. Optionally, the memory 1305 may include at least one storage apparatus located away from the processor 1301. The memory 1305 stores the following elements, executable modules, or data structures, or their subsets, or their extended sets, such as an operating system 13051, which includes various system programs and is configured to implement various basic services and process a hardware-based task, and an application program module 13052, which includes various cloud applications, and is configured to implement various application services, for example, a database application and a map application, where the application program module 13052 includes but is not limited to a module implementing functions of the policy manager, the security analyzer, the security processor, and the information notifier in the apparatus for processing an attack behavior of a cloud application.

For specific implementation of the modules in the application program module 13052, refer to the apparatus and method embodiments of the present disclosure, and details are not described herein again.

Correspondingly, the security detector provided in this embodiment of the present disclosure may be a function module on the cloud host in the cloud computing system. For example, when the cloud host is a virtual machine, the security detector may be an application program independently running on the virtual machine, and when the application program is being executed by the virtual machine, behaviors of another cloud application running on the virtual machine may be detected. When the cloud host is a physical machine, the security detector may be an application program stored in a memory of the physical machine, where a CPU of the physical machine may implement, by reading and executing the application program, functions of detecting a behavior of another cloud application running on the physical machine.

Figure 9:
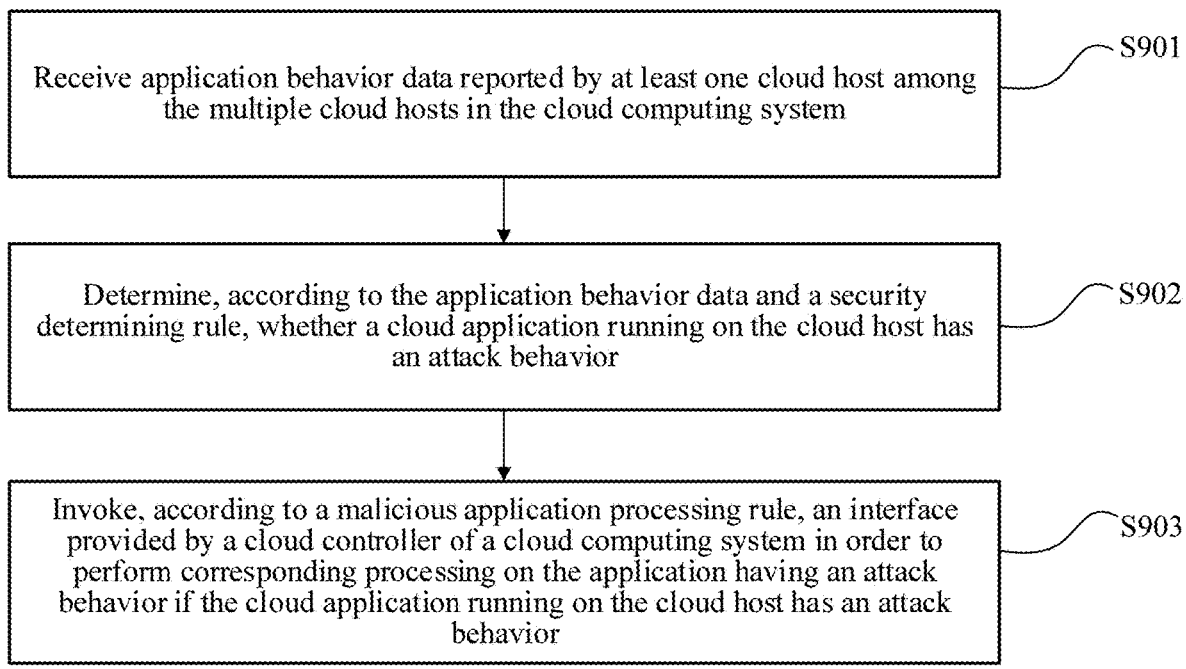
FIG. 9 is a flowchart of a method for processing an attack behavior of a cloud application according to an embodiment of the present disclosure.

Based on the foregoing apparatus embodiment, an embodiment of the present disclosure further provides a method for processing an attack behavior of a cloud application in a cloud computing system, where the cloud computing system includes multiple cloud hosts, and the cloud host may be a physical machine or a virtual machine. At least one of the multiple cloud hosts in the cloud computing system is a cloud controller, and the cloud controller is communicatively connected to each cloud host in the cloud computing system or is integrated into a cloud host, and is configured to control cloud applications running on the multiple cloud hosts in the cloud computing system. One or more cloud applications run on each of the cloud hosts, and one security detector is deployed on each cloud host. The security detector is responsible for detecting, according to a behavior detection rule, a behavior of a cloud application running on the cloud host. The method for processing an attack behavior of a cloud application provided in this embodiment of the present disclosure may be executed by a cloud host in the cloud computing system, or a cloud controller. As shown in FIG. 9, the method includes the following steps.

Step S901: Receive application behavior data reported by at least one cloud host among the multiple cloud hosts in the cloud computing system, where the application behavior data is obtained after a security detector on the cloud host detects, according to a behavior detection rule, a cloud application running on the cloud host, and the application behavior data represents a running status of the cloud application running on the cloud host.

Step S902: Determine, according to the application behavior data and a security determining rule, whether the cloud application running on the cloud host has an attack behavior.

Step S903: Invoke, according to a malicious application processing rule, an interface provided by a cloud controller in the cloud computing system in order to process the cloud application having an attack behavior if the cloud application running on the cloud host has an attack behavior.

Preferably, invoking an interface provided by a cloud controller in order to perform corresponding processing on the cloud application having an attack behavior includes invoking the cloud controller to close the cloud application, migrate the cloud application to an isolated cloud host, or disable a user account of the cloud application.

Preferably, in step S903, if the cloud application running on the cloud host has an attack behavior, user information to which the cloud application belongs may also be searched for according to initial information of the cloud application having an attack behavior, and then the application behavior data of the cloud application having an attack behavior and the user information that is obtained through searching are backed up, and attack information notification processing is performed according to an information notification rule, where the initial information of the cloud application uniquely identifies the cloud application, the initial information may be a process ID, a process name, or both, and the user information of the cloud application includes but is not limited to a user name, a user e-mail address, and a user identity number. It should be noted that, that the application behavior data and the user information to which the cloud application belongs are backed up may include that the application behavior data and the user information are stored into a reliable storage medium in a data format such as a table, a log, or a document such that the administrator can view them.

Further, performing attack information notification processing includes but is not limited to one of or any combination of generating alarm information, displaying a cloud application having an attack behavior and user information to which the cloud application belongs, and notifying an alarm center of user information to which a cloud application having an attack behavior belongs.

Optionally, in step S903, if the cloud application running on the cloud host does not have an attack behavior, the received application behavior data of the cloud application is discarded.

It should be noted that, the security determining rule defines which behavior of a cloud application is an attack behavior, the malicious application processing rule defines a manner of processing the cloud application having an attack behavior, and the behavior detection rule defines which behavior of a cloud application is to be detected, that is, the behavior detection rule indicates a detection indicator for detecting a cloud application. Generally, the behavior detection rule and the security determining rule are closely related and may be interchanged. Therefore, in an embodiment, the security determining rule may be converted into the behavior detection rule, and the behavior detection rule is delivered to the security detector. For example, if the security determining rule includes that if a quantity of external TCP ports requested by a cloud application exceeds 100, it is determined that the cloud application has a port sniffing behavior, and the behavior detection rule include collecting a quantity of different TCP ports requested by the cloud application. In this way, the security detector on the cloud host should detect the quantity of different TCP ports requested by the cloud application, and send a detection result to the cloud analyzer.

Optionally, in step S903, all cloud applications having attack behaviors (malicious applications) may be processed together, for example, closing the malicious applications, migrating the malicious applications to an isolated cloud host, or disabling user accounts of the malicious applications. Optionally, different degrees or different types of processing may be performed on the malicious applications according to types of attack behaviors of the malicious applications or danger levels of attack behaviors of the malicious applications. For example, a malicious application having a relatively low danger level may be migrated or isolated, and a user account of a malicious application having a high danger level may be disabled. It may be understood that, in this case, a type or a danger level of an attack behavior of a malicious application, needs to be determined according to behavior data of the malicious application. For example, a malicious application may be distinguished from a normal application according to behavior data of a cloud application and the security determining rule, and then, a pre-configured application feature library may further be searched, to determine a type of an attack behavior of the malicious application, for example, denial-of-service attack, Trojan attack, or worm attack. For another example, after the malicious application having an attack behavior is determined according to the behavior data of the cloud application and the security determining rule, the pre-configured application feature library may be searched according to the behavior data of the cloud application in order to determine a type of the attack behavior of the application, and then, a danger level of the attack behavior of the application is determined according to the type of the attack behavior of the application, where the application feature library describes a mapping relationship between a behavior feature of an application and a type of an attack behavior of the application. Optionally, the application feature library may be an independent data set in the cloud computing system, and after the malicious application having an attack behavior is determined according to the behavior data of the cloud application and the security determining rule, the application feature library may further be searched to determine the type of the attack behavior of the malicious application. Certainly, the application feature library may be a subset of the security determining rule, and after it is determined, according to the security determining rule, that a cloud application is a malicious application, a type of an attack behavior of the malicious application may further be determined according to the application feature library included in the security determining rule. It may be understood that, different types of attack behaviors have different danger levels, and a danger level needs to be determined according to a degree of harm caused to the system by an attack behavior. An attack behavior causing severer harm to the cloud computing system has a higher danger level. Generally, a mapping table may be configured in order to represent a correspondence between a type of an attack behavior of an application and a danger level of the application. In this way, the danger level of the attack behavior of the application may be determined according to the type of the attack behavior of the application and by searching the table. Optionally, the malicious application may also be processed according to a security level of the cloud computing system, where different security levels correspond to different processing manners. For example, the security level of the cloud computing system may set to "high," "medium," and "low." When the security level of the cloud computing system is "high," the malicious application is closed, and a user account of the malicious application is disabled. When the security level of the cloud computing system is "low," the malicious application is migrated to a specific cloud host to isolate the malicious application. Finally, it should be noted that, three manners of processing malicious applications, that is, processing the malicious applications together, processing the malicious applications according to types or danger levels of attack behaviors, and processing the malicious applications according to a security level of the cloud computing system, may be indicated by a malicious application processing rule. Different processing manners correspond to different malicious application processing rules.

Preferably, in another embodiment, an administrator may configure one or more of the security determining rule, the malicious application processing rule, and the information notification rule using the configuration interface. The configuration interface may be a web page, an API, or the like. Further, during configuration of a malicious application processing rule, different processing rules may be configured according to attack types or danger levels of malicious applications in order to differentially process the malicious applications, thereby implementing flexibility and scalability of security protection. Certainly, it may be understood that one or more of the three rules may not be configured by the administrator, and may be defined by the cloud computing system according to a default rule.

Further, in order to implement finer-granularity security protection, the behavior detection rule may include a process detection rule or a thread detection rule. In this way, process-level or thread-level detection may be performed on an application. Then, a process or thread having an attack behavior is determined based on a detection result of the security detector, and the process or thread having an attack behavior is processed in order to further implement process-level or thread-level security protection.

In the method for processing an attack behavior of a cloud application provided in this embodiment of the present disclosure, an application deployment scenario of a cloud computing system can be satisfied, security protection can be performed based on an application level of cloud computing, mutual attacks between different applications on a same host, or internal attacks launched on a host can be prevented, and impact on a normal application can be reduced. Further, a malicious application processing policy may be configured in order to further differentially process malicious applications according to different security levels or different attack types.

Figure 10:
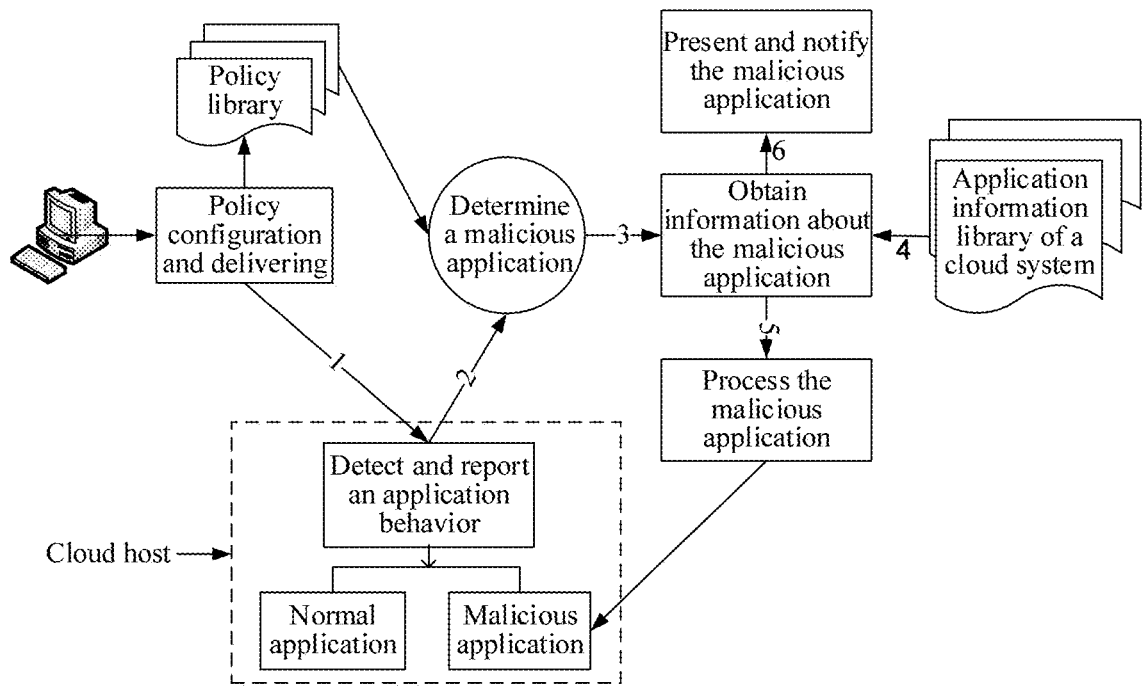
FIG. 10 is a flowchart of a method for processing an attack behavior of a cloud application according to an embodiment of the present disclosure.

With reference to a specific example, the following further describes in detail the method for processing an attack behavior of a cloud application provided in this embodiment of the present disclosure. As shown in FIG. 10, the method for processing an attack behavior of a cloud application includes the following main working process.

1. Configure, using a configuration interface, a security determining rule used to determine an attack behavior of an application, store the security determining rule into a policy library, convert the security determining rule into a behavior detection rule, and deliver the behavior detection rule to a security detector on a cloud host.

2. The security detector detects a behavior of a cloud application according to the behavior detection rule, and generates and reports application behavior data.

3. Determine, according to the collected application behavior data and the security determining rule, a malicious application having an attack behavior.

4. Search an application library of the cloud computing system according to initial information of the malicious application for user information of the malicious application.

5. Invoke a cloud controller to close the malicious application, or migrate the malicious application to an isolated cloud host, or disable a user account of the malicious application.

6. Notify the user information of the malicious application to an administrator or an alarm center.

In this example, the apparatus for processing an attack behavior of a cloud application successfully detects and processes a malicious application, which does not severely affect a normal application. Further, after it is found that an application has an attack behavior, a manner of processing the malicious application varies with a type or a danger level of the attack behavior of the malicious application, where a manner of processing the malicious application may be indicated by a malicious application processing rule, and the malicious application processing rule may be configured by the administrator using the configuration interface, where the configuration interface may be a GUI, a configuration window in a form of a web page, an API, or the like.

In the method for processing an attack behavior of a cloud application provided in this embodiment of the present disclosure, an application deployment scenario of a cloud computing system can be satisfied, security protection can be performed based on an application level of cloud computing, mutual attacks between different applications on a same host, or internal attacks launched on a host can be prevented, and impact on a normal application can be reduced. Further, a malicious application processing policy may be configured, to further differentially process malicious applications according to different security levels or different attack types.

Figure 11:
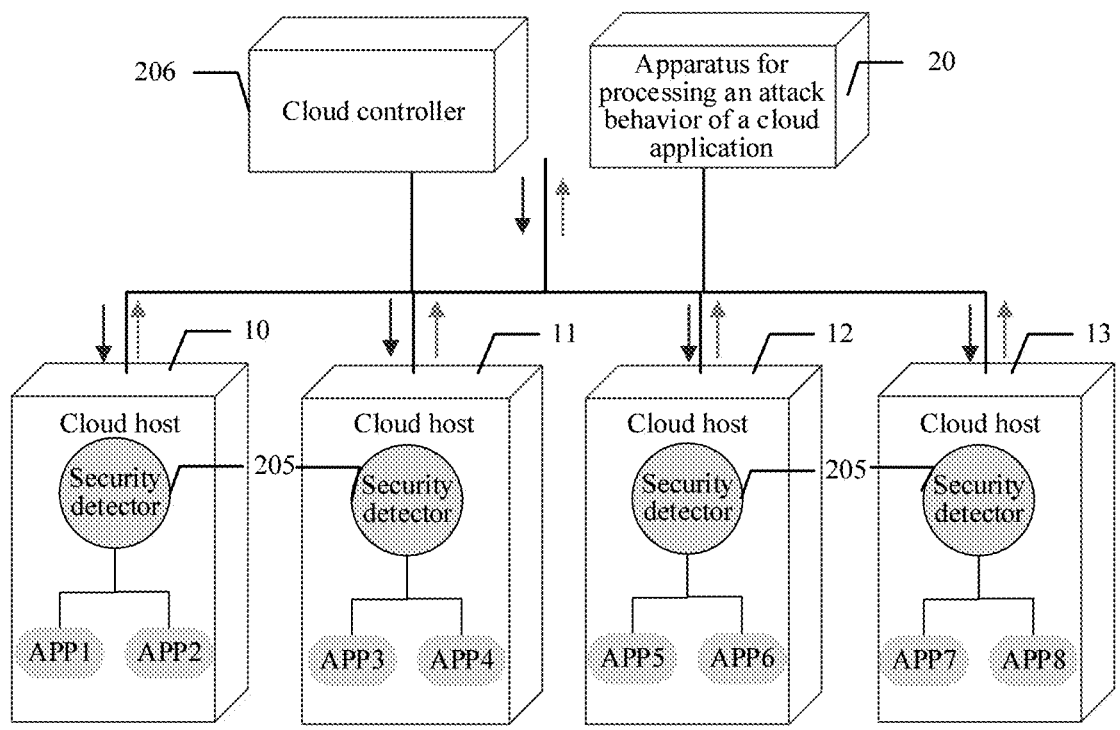
FIG. 11 is a schematic diagram of a security protection system of a cloud application according to an embodiment of the present disclosure.

As shown in FIG. 11, an embodiment of the present disclosure further provides a security protection system of a cloud application, which is applied to a cloud computing system, and is configured to implement the method for processing an attack behavior of a cloud application. The security protection system of a cloud application includes an apparatus for processing an attack behavior of a cloud application 20, a cloud controller 206, and multiple security detectors 205, where the multiple security detectors 205 are deployed on multiple cloud hosts 10, 11, 12, and 13, and each of the cloud hosts 10, 11, 12, and 13 corresponds to one of the security detectors 205. The cloud controller 206 is communicatively connected to the multiple cloud hosts 10, 11, 12, and 13, or is integrated into one cloud host among the multiple cloud hosts 10, 11, 12, and 13, and is configured to manage and control the multiple cloud hosts 10, 11, 12, and 13, where one or more cloud applications, such as APP1, APP2, APP3, APP4, APP5, APP6, APP7, and APP8, run on each of the cloud hosts 10, 11, 12, and 13. The apparatus for processing an attack behavior of a cloud application 20 stores a security determining rule and a malicious application processing rule.

The security detector 205 is configured to detect one or more cloud applications according to a behavior detection rule in order to obtain application behavior data, and report the application behavior data to the apparatus for processing an attack behavior of a cloud application 20. For an example, the cloud applications APP1 and APP2 run on a cloud host 10 corresponding to the security detector 205.

The apparatus for processing an attack behavior of a cloud application 20 is configured to receive the application behavior data reported by the security detector 205 on at least one cloud host among the multiple cloud hosts 10, 11, 12, and 13, determine, according to the application behavior data and the security determining rule, whether the cloud application running on the cloud host 10, 11, 12, and 13 has an attack behavior, and if determining that the cloud application running on the cloud host 10, 11, 12, and 13 has an attack behavior, invoking, according to the malicious application processing rule, the cloud controller 206 to process the cloud application having an attack behavior.

Optionally, the behavior detection rule may be obtained after the apparatus for processing an attack behavior of a cloud application 20 converts the security determining rule, and is delivered to the security detector 205.

Optionally, if determining that the cloud application running on the cloud host 10, 11, 12, and 13 has an attack behavior, the apparatus for processing an attack behavior of a cloud application 20 may further search, according to the initial information of the cloud application having an attack behavior, for user information to which the cloud application belongs, and then back up the application behavior data of the cloud application having an attack behavior and the user information that is obtained through searching, and perform attack information notification processing according to an information notification rule, where the initial information of the cloud application uniquely identifies the cloud application, the initial information may be a process ID, a process, or both, and the user information of the cloud application includes but is not limited to a user name, a user e-mail address, and a user identity number.

It should be noted that, that the application behavior data and the user information to which the cloud application belongs are backed up may include that the application behavior data and the user information are stored into a reliable storage medium in a data format such as a table, a log, or a document such that the administrator can view them.

Further, the performing attack information notification processing includes but is not limited to generating alarm information, displaying a cloud application having an attack behavior and user information to which the cloud application belongs, and notifying an alarm center of user information to which a cloud application having an attack behavior belongs.

Optionally, the apparatus for processing an attack behavior of a cloud application 20 is communicatively connected to the cloud controller 206, or the apparatus for processing an attack behavior of a cloud application 20 is integrated into the cloud controller 206.

Preferably, in another embodiment, the apparatus for processing an attack behavior of a cloud application 20 includes a configuration interface, and the administrator or the configuration program may configure, using the configuration interface, one or more of the security determining rule, the malicious application processing rule, and the information notification rule, where the configuration interface may be a GUI, a configuration window in a form of a web page, an API, or the like. Further, during configuration of a malicious application processing rule, different processing rules may be configured according to attack types or danger levels of malicious applications in order to differentially process the malicious applications, thereby implementing flexibility and scalability of security protection. Certainly, it may be understood that one or more of the three rules may not be configured by the administrator, and may be defined by the cloud computing system according to a default rule.

Further, to implement finer-granularity security protection, the behavior detection rule delivered to the security detector by the apparatus for processing an attack behavior of a cloud application 20 may include a process detection rule or a thread detection rule. In this way, the security detector 205 may perform process-level or thread-level detection on a cloud application. The apparatus for processing an attack behavior of a cloud application 20 may determine, based on a detection result of the security detector 205, a process or thread having an attack behavior, and then, the apparatus for processing an attack behavior of a cloud application 20 may process a process or thread having an attack behavior in order to further implement process-level or thread-level security protection.

It should be noted that, the apparatus for processing an attack behavior of a cloud application 20 included in the security protection system of a cloud application in this embodiment of the present disclosure may be the apparatus for processing an attack behavior of a cloud application described in any one of the foregoing apparatus embodiments. For specific implementation, refer to the foregoing apparatus and method embodiments, and details are not described herein again.

In the system for processing an attack behavior of a cloud application provided in this embodiment of the present disclosure, an application deployment scenario of a cloud computing system can be satisfied, security protection can be performed based on an application level of cloud computing, mutual attacks between different applications on a same host, or internal attacks launched on a host can be prevented, and impact on a normal application can be reduced. Further, a malicious application processing policy may be configured in order to further differentially process malicious applications according to different security levels or different attack types.

A person of ordinary skill in the art may understand that all or some of the steps of the methods in the embodiments may be implemented by a program instructing related hardware (such as a processor). The program may be stored in a computer readable storage medium. The storage medium may include a read-only memory (ROM), a RAM, a magnetic disk, or an optical disc.

The foregoing describes in detail the method and apparatus for processing an attack behavior of a cloud application, and the system that are provided in the embodiments of the present disclosure. In this specification, specific examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. An apparatus for processing an attack behavior in a cloud computing system, comprising:
   a security processor;
   a policy manager configured to:
      store a security determining rule and a malicious application processing rule;
      convert the security determining rule into a behavior detection rule; and
      deliver the behavior detection rule to a security detector deployed on at least one cloud host among a plurality of cloud hosts in the cloud computing system; and
   a security analyzer coupled to the security processor and the policy manager and configured to:
      receive application behavior data from the security detector, wherein the application behavior data corresponds to a behavior of a cloud application running on the at least one cloud host, and wherein the behavior of the cloud application is detected by the security detector using the behavior detection rule; and
      send the application behavior data to the security processor when the cloud application running on the at least one cloud host comprises the attack behavior, wherein the application behavior data represents a running status of the cloud application, and wherein the attack behavior is detected according to the application behavior data and the security determining rule stored in the policy manager, and
   wherein the security processor is configured to invoke, according to the malicious application processing rule stored in the policy manager, an interface provided by a cloud controller in the cloud computing system in order to process the cloud application.

2. The apparatus of claim 1, further comprising an information notifier coupled to the security processor, wherein the policy manager is further configured to store an information notification rule, wherein the security analyzer is further configured to:
   acquire initial information of the cloud application; and
   send the initial information to the security processor when the cloud application has the attack behavior,
   wherein the initial information identifies the cloud application,
   wherein the security processor is further configured to:
   search, according to the initial information of the cloud application, for user information to which the cloud application belongs; and
   send the user information and the application behavior data to the information notifier, and
   wherein the information notifier is configured to:
   store the application behavior data and the user information to which the cloud application belongs; and
   perform attack information notification processing according to the information notification rule stored in the policy manager.

3. The apparatus of claim 1, wherein the malicious application processing rule indicates manners of processing different types of malicious applications or manners of processing malicious applications comprising different danger levels, wherein the malicious applications are cloud applications having attack behaviors, and wherein the security processor is further configured to:
   perform processing on the cloud application according to a type of the attack behavior of the cloud application, wherein a manner of processing the cloud application is indicated by the malicious application processing rule; or
   perform processing on the cloud application according to a danger level of the attack behavior of the cloud application, wherein a manner of processing the cloud application having the danger level is indicated by the malicious application processing rule.

4. The apparatus of claim 2, wherein the attack information notification processing comprises at least one of:
   generating alarm information;
   displaying the cloud application and the user information to which the cloud application belongs; or
   notifying an alarm center of the user information to which the cloud application belongs.

5. The apparatus of claim 1, wherein the apparatus is integrated into the cloud controller.

6. The apparatus of claim 2, wherein one or more of the security determining rule, the malicious application processing rule, or the information notification rule are configured using a configuration interface of the policy manager, and wherein the configuration interface of the policy manager comprises at least one of a configuration window or an application programming interface (API).

7. The apparatus of claim 1, wherein the behavior detection rule comprises a thread detection rule, and wherein the application behavior data is obtained after the security detector detects a thread of the cloud application according to the behavior detection rule.

8. The apparatus of claim 7, wherein the security analyzer is further configured to discard the application behavior data when the cloud application does not have the attack behavior.

9. A method for processing an attack behavior in a cloud computing system comprising:
   storing, by a policy manager, a security determining rule and a malicious application processing rule;
   converting, by the policy manager, the security determining rule into a behavior detection rule;
   sending, by the policy manager, the behavior detection rule to a security detector deployed on at least one cloud host among a plurality of cloud hosts in the cloud computing system;
   receiving, by a security analyzer, application behavior data from the security detector, wherein the application behavior data represents a running status of the cloud application running on the at least one cloud host, wherein the application behavior data corresponds to a behavior of the cloud application running on the at least one cloud host, and wherein the behavior of the cloud application is detected by the security detector using the behavior detection rule;
   determining, by the security analyzer, according to the application behavior data and the security determining rule that is stored in the policy manager, whether the cloud application running on the cloud host has an attack behavior; and
   invoking, according to a malicious application processing rule, an interface provided by a cloud controller to process the cloud application when the cloud application running on the at least one cloud host has the attack behavior.

10. The method of claim 9, further comprising:
searching, according to initial information of the cloud application, for user information to which the cloud application belongs, wherein the initial information identifies the cloud application;
storing the application behavior data of the cloud application and the user information obtained through searching; and
performing attack information notification processing according to an information notification rule.

11. The method of claim 9, further comprising discarding the application behavior data when the cloud application running on the at least one cloud host does not comprise the attack behavior.

12. The method of claim 9, wherein the malicious application processing rule indicates manners of processing different types of malicious applications or manners of processing malicious applications comprising different danger levels, wherein the malicious applications are cloud applications having attack behaviors, and wherein invoking the interface provided by the cloud controller to process the cloud application comprises:
performing processing on the cloud application according to a type of the attack behavior of the cloud application, wherein a manner of processing the cloud application is indicated by the malicious application processing rule; or
performing processing on the cloud application according to a danger level of the attack behavior of the cloud application, wherein a manner of processing an application having the danger level is indicated by the malicious application processing rule.

13. The method of claim 10, wherein performing the attack information notification processing comprises at least one of the following operations:
generating alarm information;
displaying the cloud application and the user information to which the cloud application belongs; or
notifying an alarm center of the user information to which the cloud application belongs.

14. The method of claim 9, wherein one or more of the security determining rule, the malicious application processing rule, or an information notification rule are configured using a configuration interface, and wherein the configuration interface comprises at least one of a configuration window or an application programming interface (API).

15. A cloud computing system comprising:
multiple cloud hosts, wherein on each of the multiple cloud hosts a security detector is deployed and one or more cloud applications run on each of the cloud hosts, and wherein a first security detector on a first cloud host among the multiple cloud hosts is configured to detect a first cloud application according to a behavior detection rule to obtain application behavior data and report the application behavior data;
a cloud controller communicatively coupled to each of the multiple cloud hosts or integrated into one of the multiple cloud hosts, wherein the cloud controller is configured to manage and control the multiple cloud hosts; and
an apparatus for processing an attack behavior coupled to the multiple cloud hosts and the cloud controller, wherein the apparatus comprises:
a memory comprising instructions; and
a processor coupled to the memory, wherein the processor is configured to execute the instructions in the memory to:
store a security determining rule and a malicious application processing rule;
convert the security determining rule into the behavior detection rule;
send the behavior detection rule to the first security detector;
receive the application behavior data reported by the first security detector on at least one cloud host among the multiple cloud hosts;
determine, according to the application behavior data and the security determining rule, whether the first cloud application running on the first cloud host has an attack behavior; and
invoke, according to the malicious application processing rule, an interface provided by the cloud controller to process the first cloud application when the first cloud application running on the first cloud host has the attack behavior.

16. The cloud computing system of claim 15, wherein the processor is further configured to perform at least one of the following operations when the first cloud application has the attack behavior:
display the first cloud application and user information to which the first cloud application belongs; or
notify an alarm center of the user information to which the first cloud application belongs.

17. The cloud computing system of claim 15, wherein the apparatus is communicatively coupled to the cloud controller.

18. The cloud computing system of claim 15, wherein when the first cloud application has the attack behavior, the processor is further configured to:
display the first cloud application and user information to which the first cloud application belongs; and
notify an alarm center of the user information to which the first cloud application belongs.

19. The cloud computing system of claim 15, wherein when the first cloud application has the attack behavior, the processor is further configured to display the first cloud application and user information to which the first cloud application belongs.

20. The cloud computing system of claim 15, wherein when the first cloud application has the attack behavior, the processor is further configured to notify an alarm center of user information to which the first cloud application belongs.

* * * * *